United States Patent [19]

Akama et al.

[11] Patent Number: 5,745,446
[45] Date of Patent: Apr. 28, 1998

[54] MULTI-DISC STORAGE PLAYER FOR PERFORMING CONTINUOUS PLAYING OF A PLURALITY OF DISCS WITHOUT OCCURRENCE OF A DISC-SEARCH-DISABLED STATE CAUSED BY IMPERFECT STORAGE OF DISCS

[75] Inventors: Yusuke Akama; Kunio Matsumoto; Noritaka Kunimaru, all of Saitama, Japan

[73] Assignee: Pioneer Electronic Corporation, Tokyo, Japan

[21] Appl. No.: 901,743

[22] Filed: Jul. 28, 1997

Related U.S. Application Data

[63] Continuation of Ser. No. 987,075, Dec. 7, 1992, abandoned, which is a continuation of Ser. No. 419,352, Oct. 10, 1989, abandoned.

[30] Foreign Application Priority Data

Nov. 14, 1988 [JP] Japan .................................. 63-288332
Dec. 2, 1988 [JP] Japan .................................. 63-306259

[51] Int. Cl.$^6$ ..................................................... G11B 17/22
[52] U.S. Cl. ..................................... 369/36; 369/39
[58] Field of Search ................................. 369/34, 35, 36, 369/37, 38, 39, 75.2, 77.2; 360/92, 99.02, 99.03; 901/9; 414/270, 275

[56] References Cited

U.S. PATENT DOCUMENTS

| | | | |
|---|---|---|---|
| 3,677,420 | 7/1972 | Cotton et al. | 414/275 |
| 4,129,889 | 12/1978 | Ban et al. | 360/105 X |
| 4,173,427 | 11/1979 | Beuch et al. | 360/98.04 X |
| 4,500,983 | 2/1985 | Sugiyama et al. | 369/77.2 |
| 4,527,262 | 7/1985 | Manto | 369/34 |
| 4,782,473 | 11/1988 | Masaki | 369/36 X |
| 4,809,252 | 2/1989 | Ikedo et al. | 369/34 |
| 4,926,406 | 5/1990 | Ikedo et al. | 369/36 |
| 4,969,138 | 11/1990 | Ikedo et al. | 369/39 X |

FOREIGN PATENT DOCUMENTS

| | | |
|---|---|---|
| 0217393 | 4/1987 | European Pat. Off. . |
| 0240926 | 10/1987 | European Pat. Off. . |
| 0265269 | 10/1987 | European Pat. Off. . |
| 2610132 | 3/1988 | France . |

*Primary Examiner*—Robert A. Weinhardt
*Attorney, Agent, or Firm*—Sughrue, Mion, Zinn, Macpeak & Seas, PLLC

[57] ABSTRACT

A multi-disc storage player in which a plurality of discs can be stored and selected in the desired order for continuous programmable playing. In particular, the player includes a positioning device for relatively positioning a disc storage portion, which is capable of systematically storing a plurality of discs, and a disc playing device in the direction of arrangement of the discs; and a disc moving device for making a selected disc move between the disc storage portion and the playing device. The positioning device includes a movable member for carrying a selected one of the disc storage portion and the playing device, a driving mechanism for making the movable member move according to an instruction of movement, and a controlling device for issuing said instruction of movement to the driving mechanism until a designated position corresponding to a disc designated by an instruction of playing coincides with a current position of the movable member. The controlling device issues an instruction of movement to the driving mechanism to operate in a direction reverse to a first direction upon detecting the passage of a predetermined period of time before the designated position coincides with the current position, after issuance of an instruction of movement in the first direction to the driving mechanism. Thus, the state of engagement between a disc, which is not completely stored in the disc storage portion, and the movable member and parts mounted thereon is released.

14 Claims, 34 Drawing Sheets

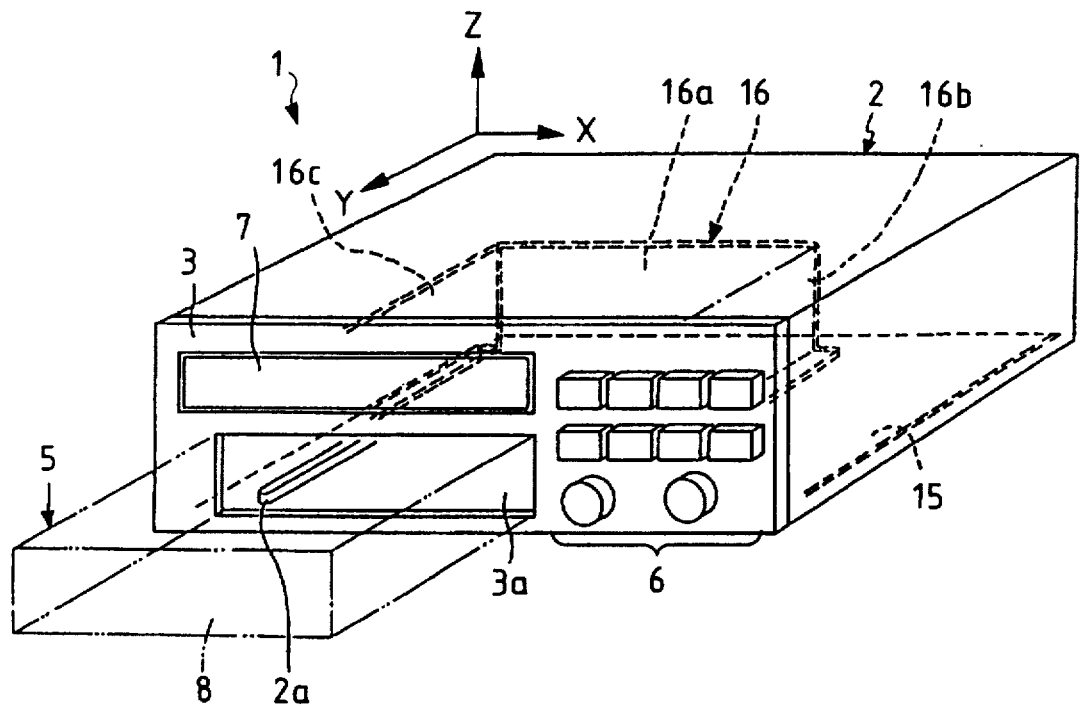
FIG. 1
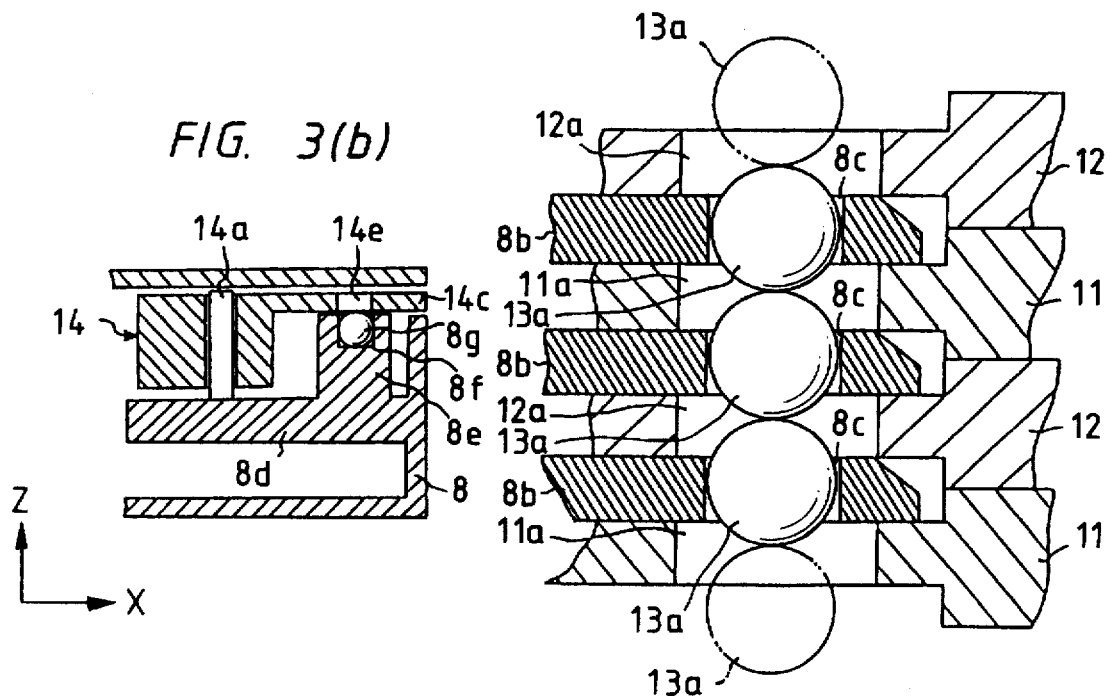
FIG. 3(a)
FIG. 3(b)

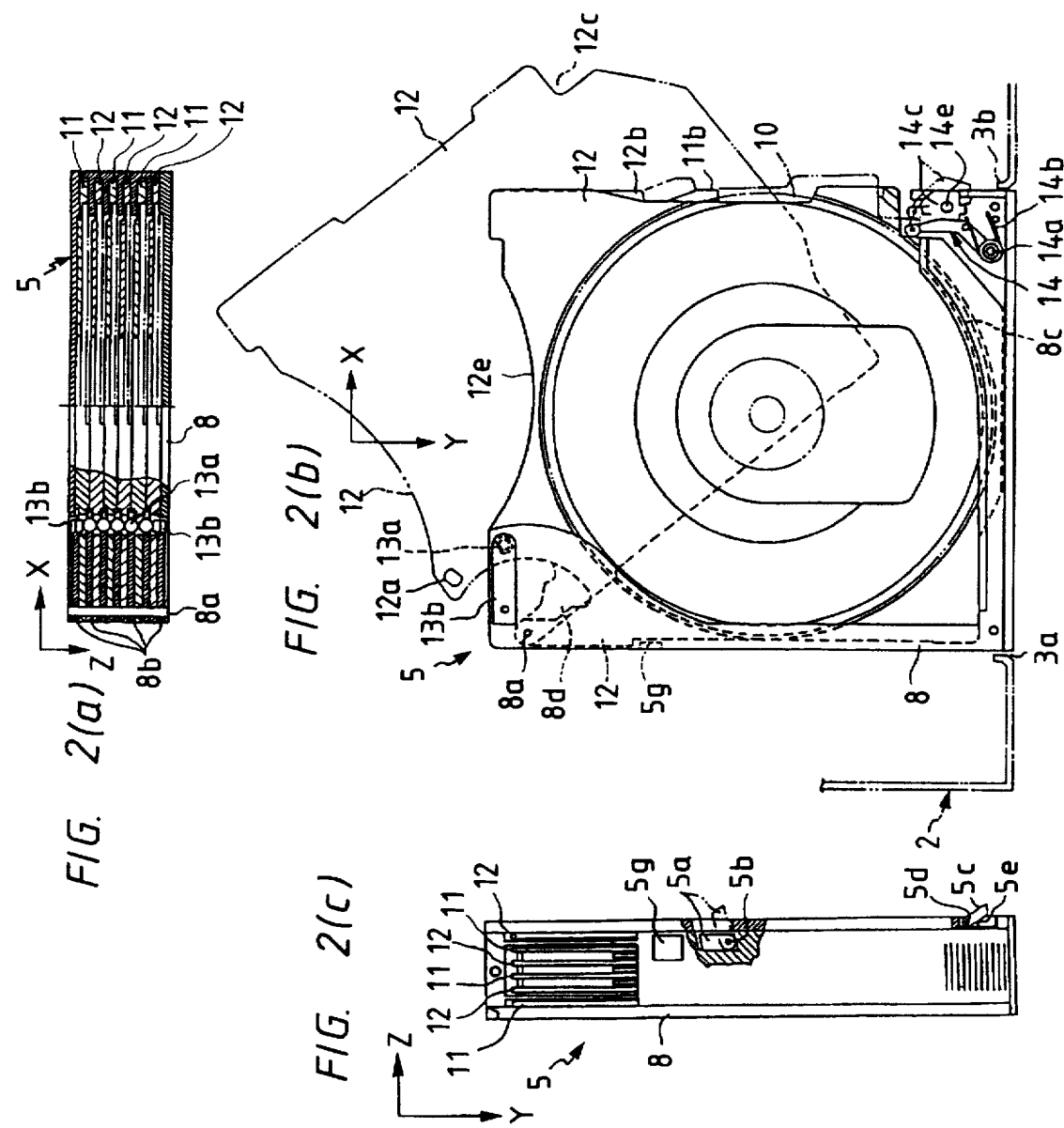

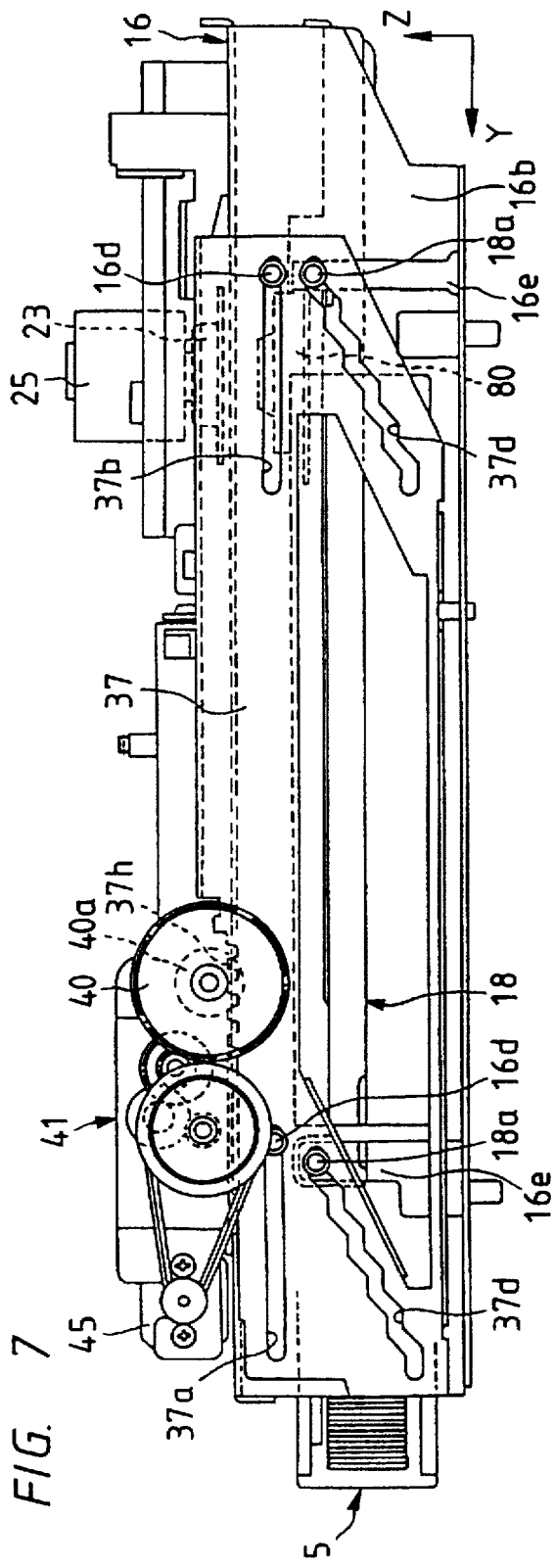
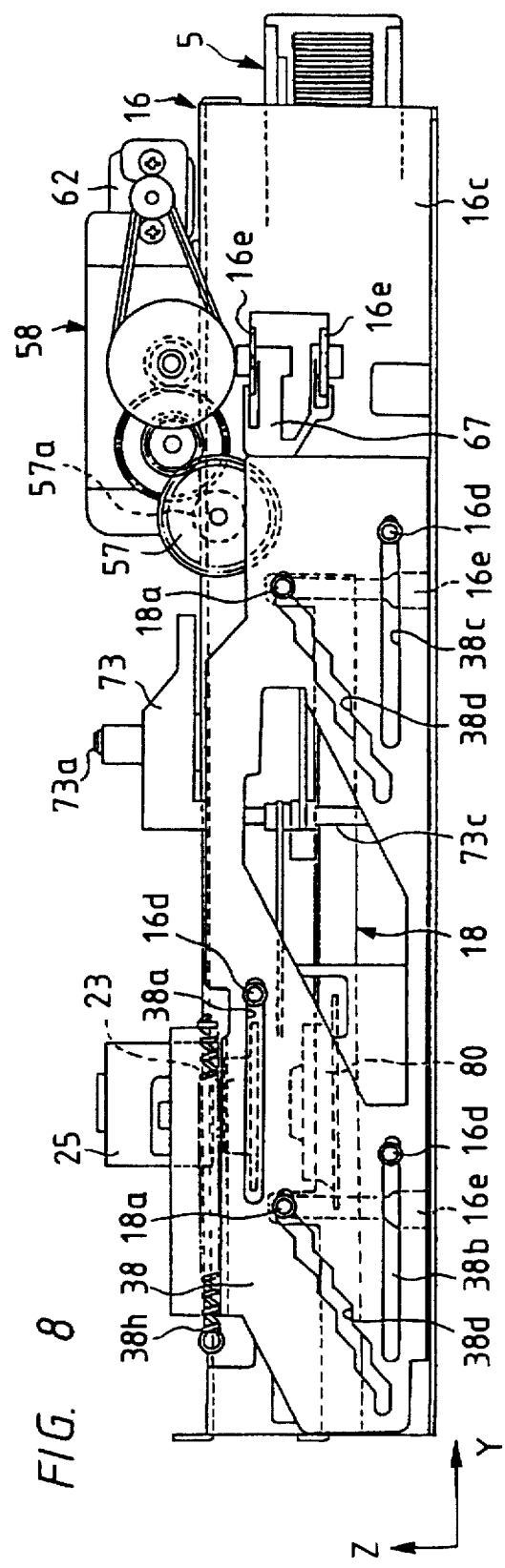
FIG. 7
FIG. 8

FIG. 17(a)
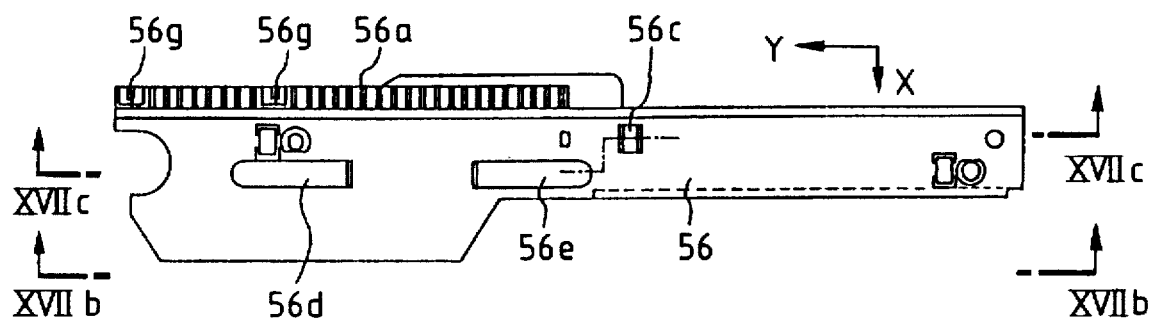
FIG. 17(b)
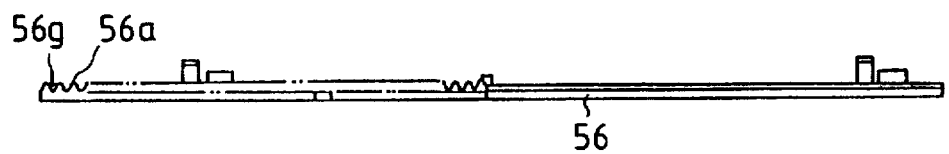
FIG. 17(c)
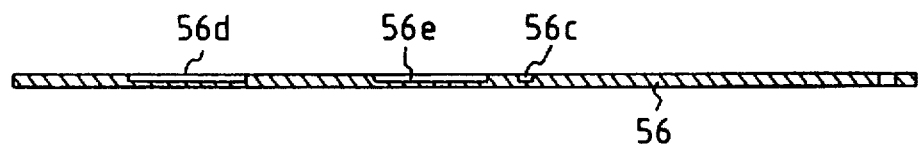
FIG. 17(d)

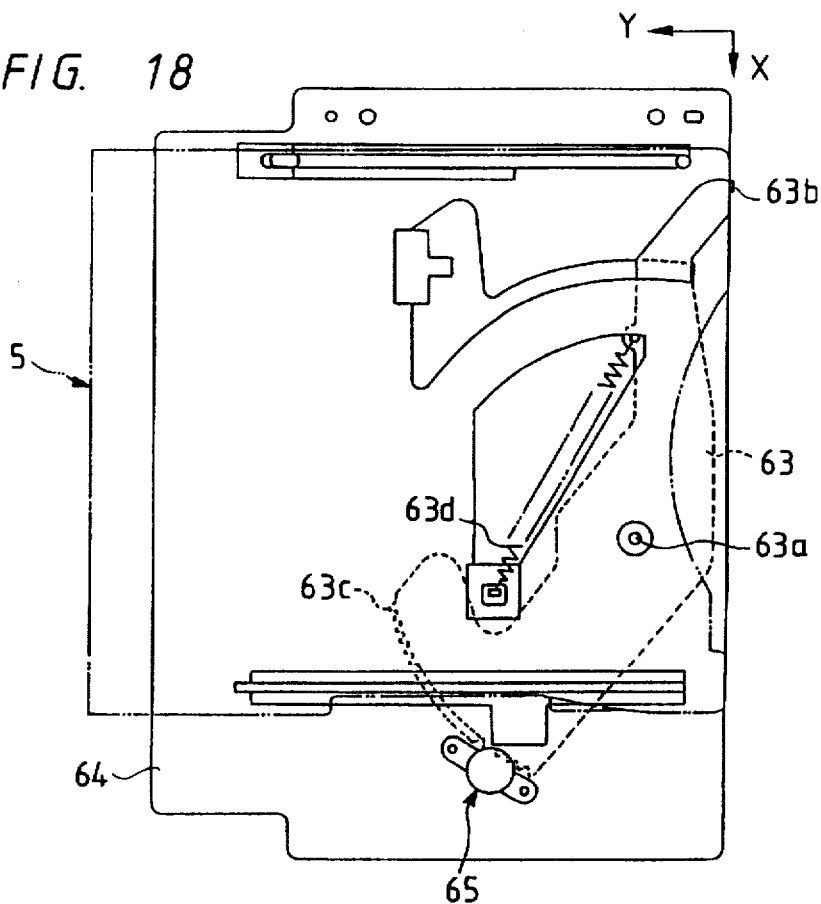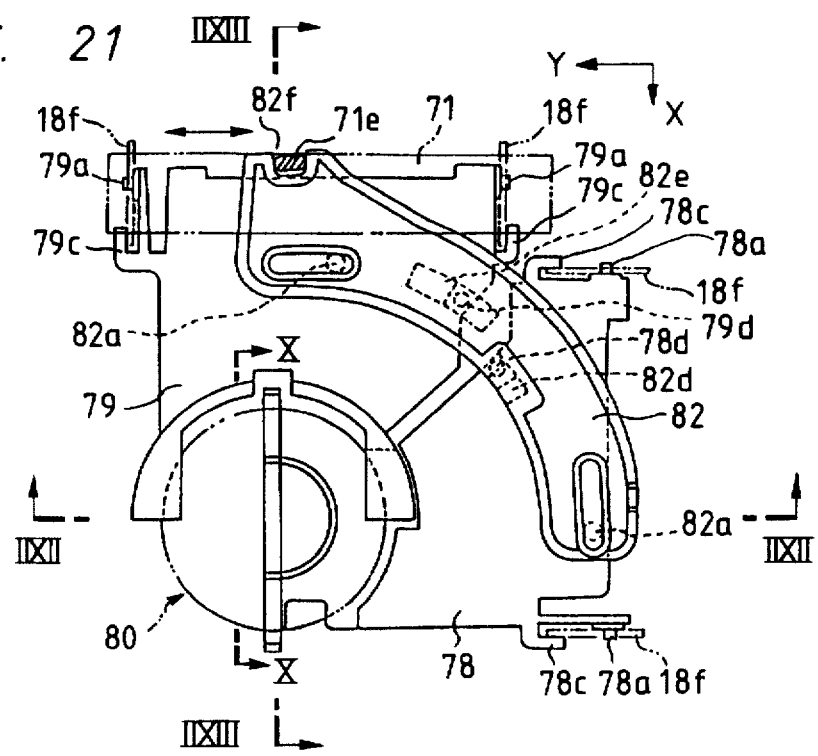

FIG. 26(a)
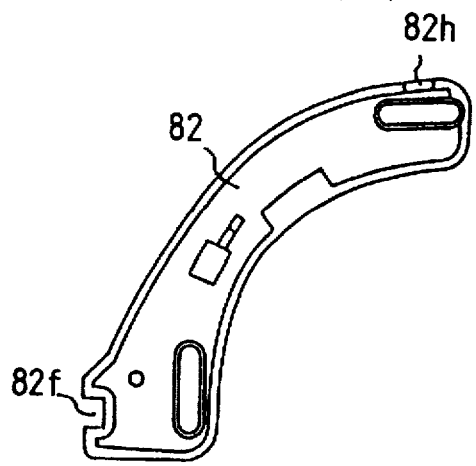
FIG. 26(b)
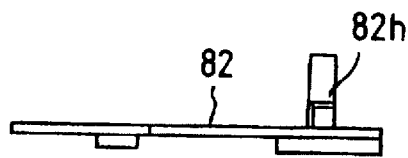
FIG. 26(c)
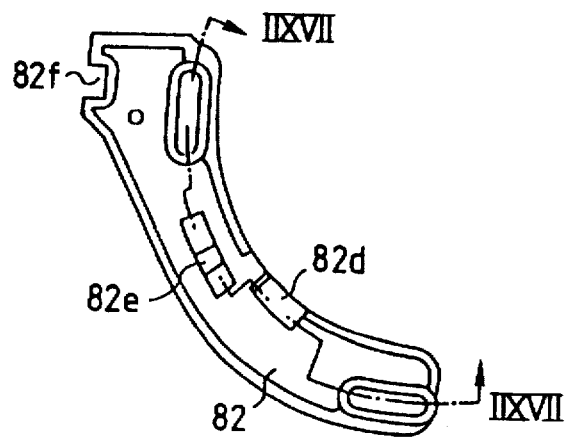
FIG. 27
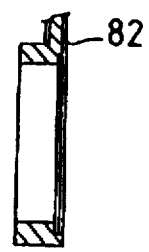

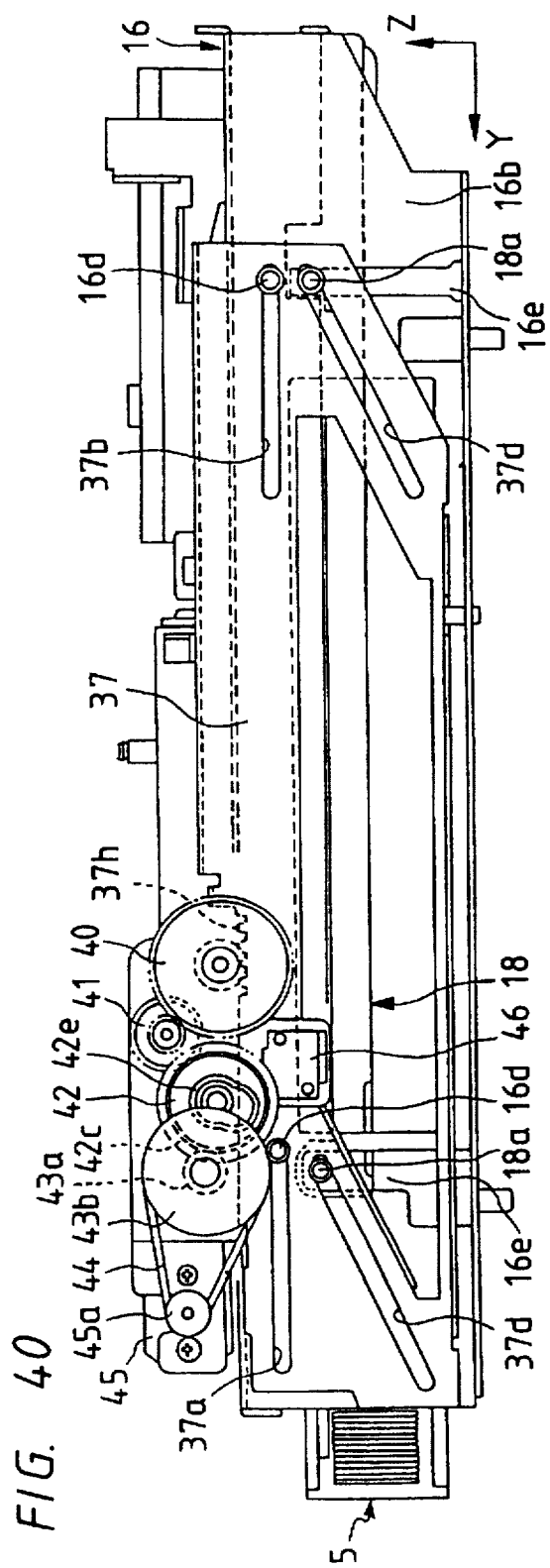

MULTI-DISC STORAGE PLAYER FOR PERFORMING CONTINUOUS PLAYING OF A PLURALITY OF DISCS WITHOUT OCCURRENCE OF A DISC-SEARCH-DISABLED STATE CAUSED BY IMPERFECT STORAGE OF DISCS

This is a continuation of application Ser. No. 07/987,075 filed Dec. 7, 1992 now abandoned, which is a continuation of application Ser. No. 07/419,352 filed Oct. 10, 1989, now abandoned.

BACKGROUND OF THE INVENTION

The present invention relates to a disc player and, in particular, to a multi-disc storage player in which a plurality of discs can be selected in the desired order for continuous programmable playing.

The multi-disc storage type player has been disclosed in Japanese Patent Unexamined Publication No. 61-261853. This type of player includes: a playing means having a turntable and a pickup; a magazine serving as a disc storage portion capable of arrangement/storage of a plurality of discs and which is inserted/mounted into a player housing; and a disc take-out conveyor mechanism for conveying suitably selected discs successively from the magazine onto a disc-carrying surface of the turntable and for returning discs from the disc-carrying surface into the magazine.

In the multi-disc player, selected discs are conveyed from the magazine to the turntable by moving the discs in the following two directions: the direction parallel to the disc-carrying surface of the turntable and the direction perpendicular thereto. This function is carried out by the aforementioned disc take-out conveyor mechanism. More specifically, a predetermined movable member is reciprocatingly moved in the direction of arrangement of the discs while the discs are arranged in the magazine, which direction is perpendicular to the disc-carrying surface of the turntable. Then, any one of the playing means, including the turntable and the magazine, is carried on the movable member, by which the movement of the discs in the direction perpendicular to the disc-carrying surface of the turntable is attained. On the other hand, the movement of the discs in the direction parallel to the disc-carrying surface of the turntable is carried out easily by projecting the discs from the magazine.

In the following, the construction for reciprocatingly moving the playing means with the movable member in the direction of disc arrangement is described with reference to the construction of the multi-disc storage player disclosed in Japanese Patent Unexamined Publication No. 61-261853.

In FIGS. 51–53, the reference numeral 151 designates a carrying member constituting the aforementioned movable member. A playing means including a turntable 152 and a pickup 153 is mounted on the carrying member 151. FIGS. 52 and 53 are sectional view taken along the lines VXII—VXII and VXIII—VXIII, respectively, in FIG. 51. The carrying member 151 is mounted on a chassis 154 so as to be reciprocatingly movable in the up-and-down directions (in the direction of the arrow Z and the direction opposite thereto). As shown in FIGS. 54 and 55, the respective discs 156 in the magazine 155 are also arranged in the up-and-down directions, so that the direction of arrangement of the discs agrees with the direction of movement of the carrying member 151.

A pair of moving members 158 and 159 extending in the front-and-rear directions (in the direction of the arrow Y and the direction opposite thereto) are provided at the left and right sides (the respective sides in the direction of the arrow X and the direction opposite thereto) of the chassis 154 so as to be movable in the front-and-rear directions. Though not shown in the drawing, a driving mechanism including a motor for moving the movable members 158 and 159 is provided. Three pins 151a are formed on the carrying member 151, one of the pins being provided at the left side thereof, the remaining two pins being provided at the right side thereof. The pins 151a are inserted into cam portions 158a and 159a formed in the movable members 158 and 159, respectively. The cam portions 158a and 159a are sloped stepwise with respect to the direction of movement of the moving members 158 and 159 so that the carrying member 151 can be intermittently moved in the up-and-down directions (in the Z direction and the direction opposite thereto) so as to correspond to the disc 156 storage position of the magazine 155 in response to the reciprocating motion of the moving members 158 and 159 (in the Y direction and the direction opposite thereto).

In such a configuration, the carrying member 151 is moved up/down by the reciprocating motion of the moving members 158 and 159 to which driving force is given to thereby attain the relative movement of the playing means including the turntable 152 and the magazine 155 in the direction of the disc arrangement (the Z direction and the direction opposite thereto).

However, the motor acting as a driving source for moving the moving members 158 and 159 still slightly rotates by inertial force after an electric current supplied to the motor is cut off in accordance with a stop signal. Accordingly, in the aforementioned configuration, the moving members 158 and 159 are moved slightly by the inertial rotation of the motor. It is therefore not always easy to stop the carrying member 151, which is moved in the up-and-down directions by the cam portions 158a and 159a, in a predetermined stop position with high accuracy. In short, from the point of view of cost, it is not always easy to perform relative positioning of the playing means and the magazine 155 in the direction of the disc arrangement with high accuracy.

The constitution for conveying discs in the direction parallel to the disc-carrying surface of the turntable 152 will now be described.

As shown in FIGS. 54 and 55, the magazine 155, which acts as a disc storage portion, is constituted by a housing 161 shaped generally like a rectangular parallelepiped and a plurality of plate-like trays 164 arranged in the housing 161 substantially perpendicularly to the disc-carrying surface of the turntable 152 (in the Z direction and the direction opposite thereto). The trays 164 are provided so as to be rotatable around a supporting shaft extending in the direction of arrangement thereof. The trays 164 are capable of carrying discs 156 on the main surfaces thereof and are capable of projection and retraction along the main surfaces with respect to the housing. In short, the conveyance in one direction of the discs 156 (disc conveyance in the direction parallel to the disc-carrying surface of the turntable) can be carried out simply by projecting the plate-like trays 164 with the discs 156 out of the housing 161.

As shown in FIG. 55, a tray engagement member 166, capable of being engaged with each tray 164 to press the tray out of the housing 161, is arranged at the left side of the magazine 155 and rotatably provided on the carrying member 151 carrying the playing means. A sliding member 167 is provided on the carrying member 151 and in the rear of the magazine 155 so as to be linearly reciprocatingly movable in the right-and-left directions (the X direction and the direction opposite thereto). The sliding member 167 is moved by a predetermined driving force producing means and engaged with the free end portion of the tray engagement member 166 at its forward moving end portion 167a to impart a rotational moment to the tray engagement member to rotate it.

In short, the tray 164 is pressed by the rotation of the tray engagement member 166 so as to be projected out of the housing 161 to position the disc 156 carried on the tray onto the turntable 152.

As shown in FIGS. 55 and 56, two pins 166a are formed on the tray engagement member 166. The pins 166a are slidably engaged with two arc-like guide grooves 151a and 151b formed in the carrying member 151, so that the disc engagement member 166 rotates while being guided by the guide grooves 151a and 151b. It is apparent from FIG. 55 that the rotational axis of each tray 164 (the center axis of the supporting shaft 162) is arranged to coincide with the rotational axis (virtual) of the tray engagement member 166.

In the aforementioned multi-disc storage player, there is further provided a detection means for detecting the completion of projection and retraction of the respective tray 164 with respect to the housing 161 of the magazine 155. The detection means is constituted by a detection switch (not shown) arranged so that its actuator can be engaged with the sliding member 167 (shown in FIGS. 54 and 55) connected to the tray engagement member 166 or a driving force transmission member (not shown) which is provided to transmit driving force from a motor or the like to the sliding member. In this manner, the detection switch can be turned on and off by the reciprocating motion of the sliding member or driving force transmission member.

In the multi-disc storage player configured in a manner as described above, the tray 164 projecting out of the housing 161 of the magazine 155 is, together with the disc, stored in the housing by rotating the tray engagement member 166 clockwise in FIG. 55 in the case where the disc 156 is returned into the magazine 155 from the turntable 152. At the same time, the detection switch (not shown) is turned on or off to check the completion of returning of the disc 156 into the magazine 155. Based on the detection signal from the detection switch, the carrying member 151, which carries the playing means including the turntable 152, is moved in the direction of disc arrangement and then positioned in a designated position corresponding to the next disc to be played. Thereafter, the tray engagement member 166 is rotated counterclockwise in FIG. 55, so that the tray 164 is projected out of the housing 161 to position the disc carried thereon onto the turntable 152. Thus, the playing of the second disc is started.

In the multi-disc storage player constructed as described above, the friction force between the housing 161 and the respective tray may be increased by the influence of greasy dirt (from human hands) and moisture deposited on the tray 164, thereby preventing a smooth rotating operation of the tray 164. In such a case, as shown in FIG. 57, the detection switch may be operated to generate the detection signal though the tray 164 is not yet completely stored in the housing 161. This is because the members, such as the tray engagement member 166, the sliding member 167 and the driving force transmission member (described above) for transmitting driving force to the sliding member, may be deformed little by little by the driving force, or the entire mechanism, constituted by the aforementioned members, may be contracted within the range of the cumulative value of common differences between the respective members. As a result, the member for operating the detection switch can move the actuator of the detection switch, though the rotation is prevented by the aforementioned friction force before the tray 164 is completely stored in the housing 161 by the pressure of the tray engagement member 166. As shown in FIG. 57, in this case, though the lifting-up of the carrying member 151 is required to be brought to a designated position corresponding to the next disc to be played, the carrying member 151 (or parts mounted thereon) strikes the tray 164, which is still projecting out of the housing 161, so that the operation is suppressed in a disc-search-disabled state.

SUMMARY OF THE INVENTION

Therefore, an object of the present invention is to provide a multi-disc storage player which can smoothly perform continuous playing of a plurality of discs without occurrence of the disc-search-disabled state caused by the imperfect storage of discs in the disc storage portion.

In order to attain the above object, according to an embodiment of the present invention, the multi-disc storage player comprises: a positioning means for relatively positioning a disc storage portion, which is capable of systematically storing a plurality of discs, and a disc playing means in the direction of arrangement of the discs; and a disc moving means for making a selected disc move between the disc storage portion and the playing means. The positioning means includes a movable member for carrying a selected one of the disc storage portion and the playing means, a driving mechanism for making the movable member move according to an instruction of movement, and a controlling means for issuing said instruction of movement to the driving mechanism until a designated position corresponding to a disc designated by an instruction of playing coincides with a current position of the movable member. The controlling means issues an instruction of movement to the driving mechanism to operate in a direction reverse to a first direction upon detecting the passage of a predetermined period of time before the designated position coincides with the current position, after issuance of an instruction of movement in the first direction to the driving mechanism. Thus, the state of engagement between a disc, which is not completely stored in the disc storage portion, and the movable member and parts mounted thereon is released.

Another object of the present invention is to provide a multi-disc storage player in which the relative positioning in the direction of the disc arrangement of the disc storage portion and the playing means, including a turntable and a pickup, can be made with high accuracy without an increase in cost.

In order to attain the object, according to the multi-disc storage player of another embodiment of the present invention, a positioning means for relatively positioning a disc playing means and a disc storage portion in the direction of arrangement of the discs include: a movable member for carrying a selected one of the disc storage portion and the playing means; a driving mechanism for making the movable member move; and controlling means for controlling the driving mechanism to move the movable member to a designated position corresponding to a disc designated by an instruction of playing. The driving mechanism includes: a partially toothed gear rotated by the rotation of a driving source; a driven gear engaged with the partially toothed gear; and a moving mechanism for making the movable member move corresponding to the rotation of the driven gear. The controlling means includes a detection means for issuing a detection signal whenever a tooth-lacking portion of the partially toothed gear reaches a position of engagement with the driven gear. The controlling means starts, the rotation of the driving source according to the instruction of playing, and stops the rotation of the driving source when the number of times the detection signal is generated reaches the number corresponding to the designated position, whereby the driving source is stopped while teeth of the driven gear are positioned in a tooth-lacking range of the partially toothed gear.

BRIEF DESCRIPTION OF THE DRAWINGS

FIG. 1 is a perspective view showing the entire multi-disc storage player according to the present invention;

FIGS. 2(a)–(2c), 3(a) and 3(b), 4(a) and 4(b) and 5(a) and 5(b) are views for explaining a magazine to be mounted into the player housing of the multi-disc storage player depicted in FIG. 1;

FIGS. 7 and 8 are sectional views taken along the lines VII—VII and VIII—VIII, respectively, FIG. 6;

FIGS. 17(a)–17(d), 18, 19(a) and 19(b), 20(a) and 20(b), 21–25, 26(a)–26(c), 27–30, 31(a) and 31(b), 32(a) and 32(b), 33(a) and 33(b), and 34(a)–34(c) are partial detailed views of the inside structure;

FIGS. 40 and 41 are sectional views taken along the lines IVX—IVX and IVXI—IVXI, respectively, in FIG. 39;

DETAILED DESCRIPTION OF THE PREFERRED EMBODIMENTS

Figure 4A:
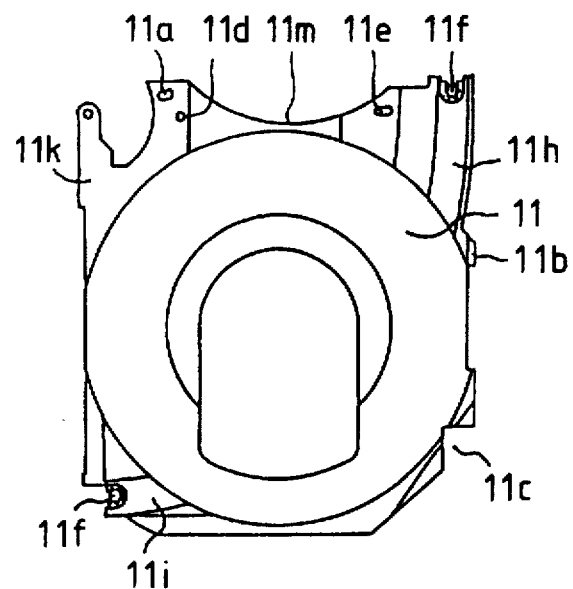
Figure 4B:
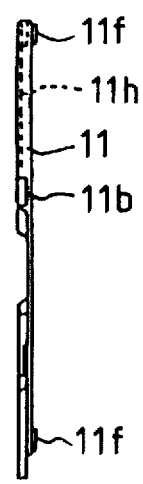
Figure 5A:
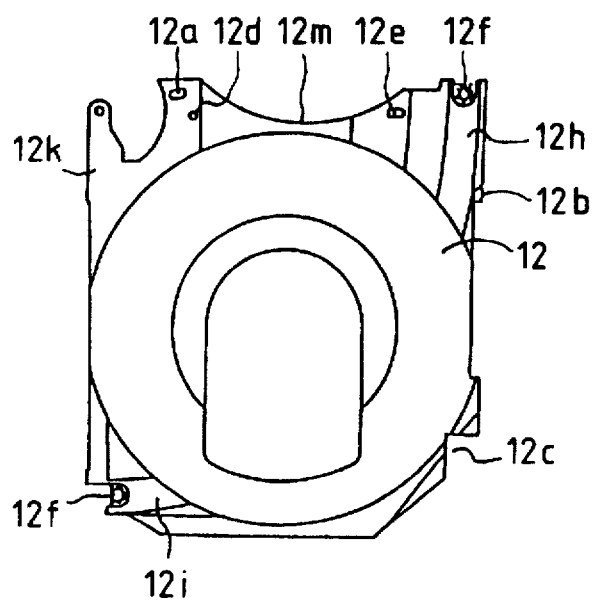
Figure 5B:
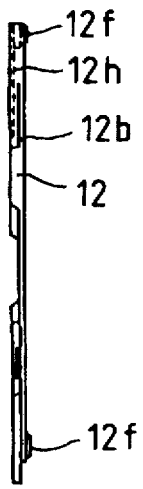

An embodiment of the multi-disc storage player according to the present invention will now be described hereunder with reference to the accompanying drawings.

In FIG. 1, the reference numeral 1 generally designates a multi-disc storage player. A front panel 3 of a player housing 2 is provided with an oblong opening portion 3a for mounting a magazine 5, as a disc storage portion, into the player housing. The opening portion 3a extends horizontally, that is, left and right is as follows. The arrow X represents the right direction; the arrow Y represents the front direction; and the arrow Z represents the upward direction. An operation portion 6 and a display portion 7 for the operation of the multi-disc storage player are provided on the front panel 3.

As shown in FIGS. 2(a)–2(c), the magazine 5 has a magazine body 8 generally shaped like a flat rectangular parallelepiped and serving as a housing, and six rectangular-plate-shaped trays classified into two groups, namely, three trays 11 and three trays 12, each of which trays is capable of carrying a disc 10 on its main surface. The trays 11 and the trays 12, each containing a disc 10, are arranged in order at intervals of a predetermined pitch in directions perpendicular to the disc-carrying surface of a turntable which will be described later, that is to say, in up-and-down directions (the Z direction and the direction opposite thereto). The trays 11 and the trays 12 are pivoted on a rotation support shaft 8a provided at the left rear end portion of the magazine body 8 and extending in the directions (up-and-down directions) of arrangement of the trays. Accordingly, the trays are capable of projection and retraction along respective main surfaces with respect to the magazine body 8.

Construction of the magazine 5 will now be described in detail. The magazine body 8 is provided with seven partitions 8b arranged in the up-and-down directions (the Z direction and the direction opposite thereto), so that the trays 11 and the trays 12 are arranged between the partitions. It is apparent from FIG. 3(a) that the partitions 8b are provided with small circular opening portions 8c formed concentrically in the vicinity of the rotation support shaft 8a. As shown in FIGS. 4(a), 4(b), 5(a) and 5(b) in which the details of the trays 11 and the trays 12 are shown, the trays are also provided with opening portions 11a and 12a opposite to the opening portions 8c formed in the partitions 8b. In this disclosure, the opening portions 8c formed in the partition 8b are referred to as "first opening portions" and the opening portions 11a and 12a formed in the trays 11 and 12 are referred to as "second opening portions." Five spherical pieces 13a movable along the directions (the Z direction and the direction opposite thereto) of the arrangement of the partitions 8b are inserted into the opening portions 8c, 11a and 12a. The diameter of each spherical movable piece 13a is equal to the pitch of the arrangement of the trays 11 and 12. A pair of leaf springs 13b is provided in the upper and lower end portions of the magazine body 8 and urge the spherical movable pieces to approach each other.

As shown in FIG. 2(b), a press lever 14 extending in the front-and-rear directions (the Y direction and the direction opposite thereto) is provided in the right front end portion of the magazine body 8. In this embodiment, one end portion (front end portion) of the press lever 14 is pivoted on the magazine body 8 through a pin 14a extending in the up-and-down directions (the Z direction and the direction opposite thereto). The other end (rear end portion) of the press lever 14 is capable of being smoothly engaged with free end portions of the trays 11 and 12. The press lever 14 is provided with a spring member 14b. The spring member 14b serves to urge the press lever 14 counterclockwise in FIG. 2(b), so that the spring member 14b gives a tray-pressing force to the press lever 14. The press lever 14 has a projection 14c capable of abutting on a flange 3b of the opening portion 3a of the player housing when the magazine 5 is detached from a magazine attachment portion of the player housing 2. When the projection 14c abuts on the flange 3b of the opening portion 3a, the projection 14c serves to move a body of the press lever 14 to urge the trays 11 and 12 toward the retracted position in the magazine body 8.

The aforementioned press lever 14 and spring member 14b form urging means for urging the trays 11 and 12 with the discs 10 thereon toward the retracted position and about the rotation support shaft 8a in the magazine body 8. The urging means, the opening portions 8c (first opening portions) respectively formed in the partitions of the magazine body 8, the opening portions 11a and 12a (second opening portions) respectively formed in the trays 11 and 12, the spherical movable pieces 13a and the leaf spring 13b make up retention means for retaining the trays 11 and 12 in the retracted position of the magazine body 8.

It is apparent from FIGS. 4(a), 4(b), 5(a) and 5(b) that the trays 11 and the trays 12 are of the same shape except that they are different in the shape and position of claw portions 11b and 12b provided to be controlled by human fingers when the trays are pulled out from the magazine body 8. The free end portions of the trays 11 and 12 have notch portions 11c and 12c capable of being engaged with the press lever 14, and pairs of jig insertion holes 11d, 11e, 12d and 12e, respectively.

Elastic members 11f and 12f, for example, formed of synthetic leather, are provided in predetermined positions on the main surfaces of adjacent trays opposite to the disc-carrying surface of the trays 11 and 12, so that the elastic members protrude beyond the main surfaces. The trays 11 and 12 have arc-like U-shaped portions 11h, 11i, 12h and 12i formed along the path swept out by the elastic members 11f and 12f provided in adjacent trays. By provision of the U-shaped portions 11h, 11i, 12h and 12i, the total size of the (six) trays 11 and 12 stacked up is reduced in the direction of stacking. Accordingly, the thickness of the magazine 5 is reduced.

As shown in FIG. 2(c), an engagement claw 5a is provided substantially in the middle portion of the right side of the magazine 5 and pivotally mounted at the one end portion to the magazine body 8 through a pin 5b so as to be movable within a predetermined range. Another engagement claw 5c is provided in the front end portion of the right side of the magazine 5 and pivotally mounted at the one end portion to the magazine body 8 through a pin 5d so as to be movable within a predetermined range. The free end portion of the engagement claw 5c is urged outward by a coiled spring 5e. The free end portions of the engagement claws 5a and 5c are capable of being engaged with the flange 3b of the opening portion 3a {refer to FIGS. 1 and 2(b)}.

The aforementioned engagement claws 5a and 5c and coiled spring 5e make up loading stopping means for stopping the loading of the magazine 5 when the loading attitude of the magazine is poor with respect to the leading portion in the player housing 2. In the case where the magazine 5 is to be loaded upside down, the engagement claw 5a is moved by its own weight and projects outward the magazine 5 so that the free end portion of the engagement claw is engaged with the flange 3b of the opening portion 3a to stop the loading of the magazine 5. In the case where the front portion of the magazine to be loaded is mistaken for the rear portion thereof, the engagement claw 5c urged outward by the coiled spring 5e is engaged with the flange 3b of the opening portion 3a to stop the loading of the magazine 5.

Because the loading stopping means may be constituted by very simple members such as the engagement claws 5a and 5c and the coiled spring 5e, the construction thereof may be simplified to easily reduce the cost.

As shown in FIGS. 2(b) and 3(b), a circular opening portion 14e is formed in the projection 14c of the press lever 14 pivotally mounted on the magazine 5. On the other hand, as shown in FIG. 3(b), an overhang 8d extending along the lower surface of the press lever 14 is provided in the magazine body 8 serving as a housing for the magazine 5. A pillar-shaped projection 8e is formed on the overhang 8d. A blind bore 8f having a circular opening is formed in the upper end portion of the projection 8d. The spherical movable piece 8g, movable in the up-and-down directions (the Z direction and the direction opposite thereto), is inserted in the blind bore 8f. The opening portion 14e formed in the projection 14c of the press lever 14 can be positioned opposite to the blind bore 8f when the press lever 14 is placed in the position represented by the solid line in FIG. 2(b), so that the spherical movable piece 8g can be partially inserted in the opening portion 14e.

The aforementioned press lever 14 and movable piece 8g make up a projection limiting means for limiting the projection of the trays 11 and 12 out of the magazine body 8 when the magazine 5 acting as a disc holder is upside down. That is to say, when the magazine 5 is upside down, the spherical movable piece 8g is moved by its own weight and partially inserted into the opening portion 14e of the press lever to thereby limit the motion of the press lever 14 and, accordingly, to limit the projection of the trays 11 and 12 out of the magazine 8.

Because the projection limiting means may be constituted by simple-shaped members such as the press lever 14 and the movable piece 8g, the construction thereof may be simplified to easily reduce the cost. With respect to the spherical movable piece 8g, available articles may be used.

As shown in FIG. 1, a chassis 16 serving as a supporting member is mounted onto a bottom plate 15 fixed in the housing 2. The chassis 16 comprises a plan portion 16a extending both in the front-and-rear directions (the Y direction and the reverse direction thereto) and in the right-and-left directions (the X direction and the reverse direction thereto), and a pair of elevational portions 16b and 16c being continuous to the right and left ends of the plan portion and extending both in the front-and-rear directions and in the up-and-down directions (the Z direction and the reverse direction thereto).

As shown in FIGS. 6–9, a moving member 18 serving as a carrying member is arranged between the rear end portions of the pair of elevational portions 16b and 16c of the chassis 16 and mounted on the elevational portion so as to be movable in the up-and-down directions (the Z direction and the direction opposite thereto) or, in other words, in the direction of arrangement of the trays 11 and 12.

Figure 9:
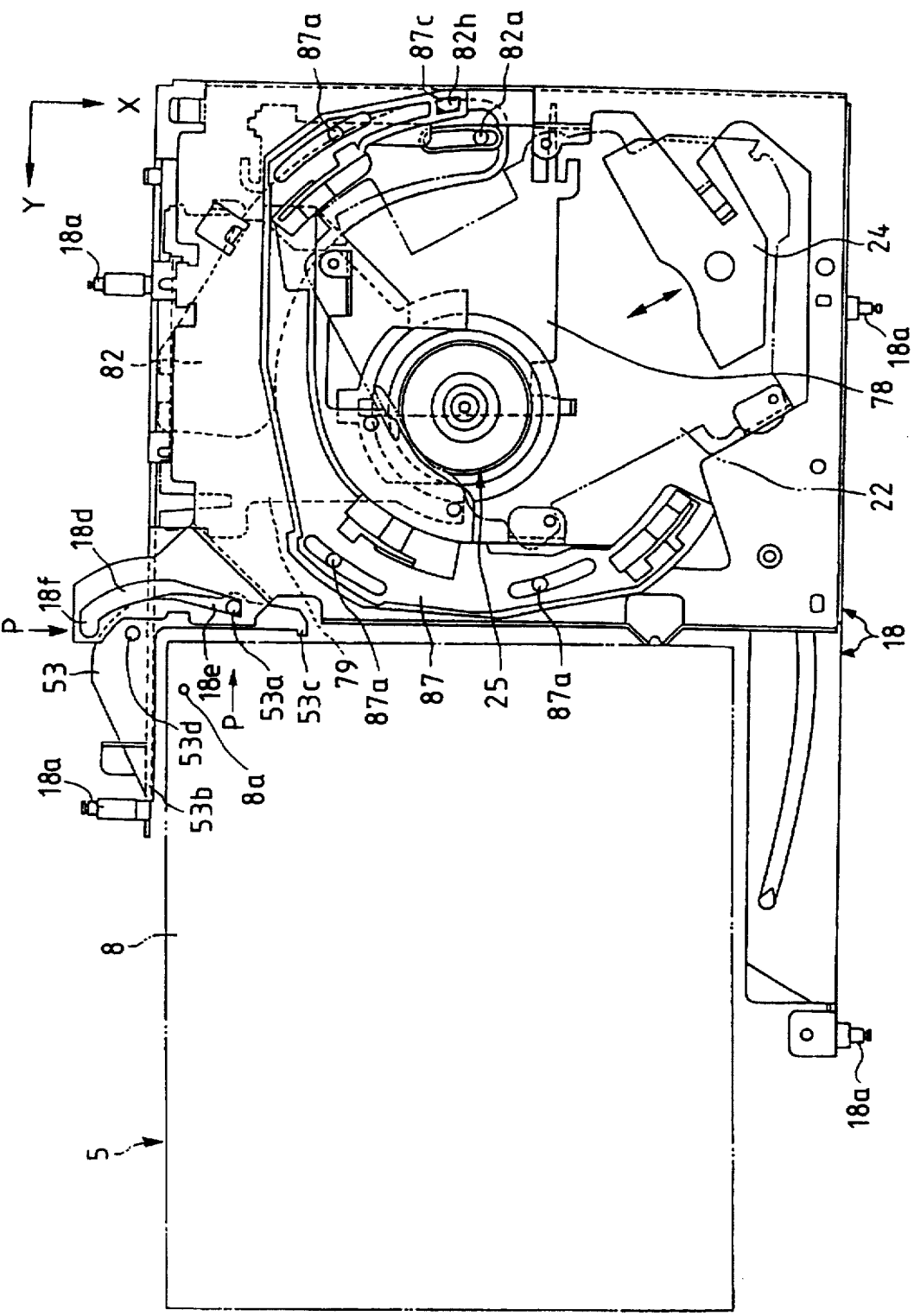
FIGS. 9–12, 13(a) and 13(b), and 15 are partial detailed views of the inside structure depicted in FIGS. 6–8.
Figure 10:
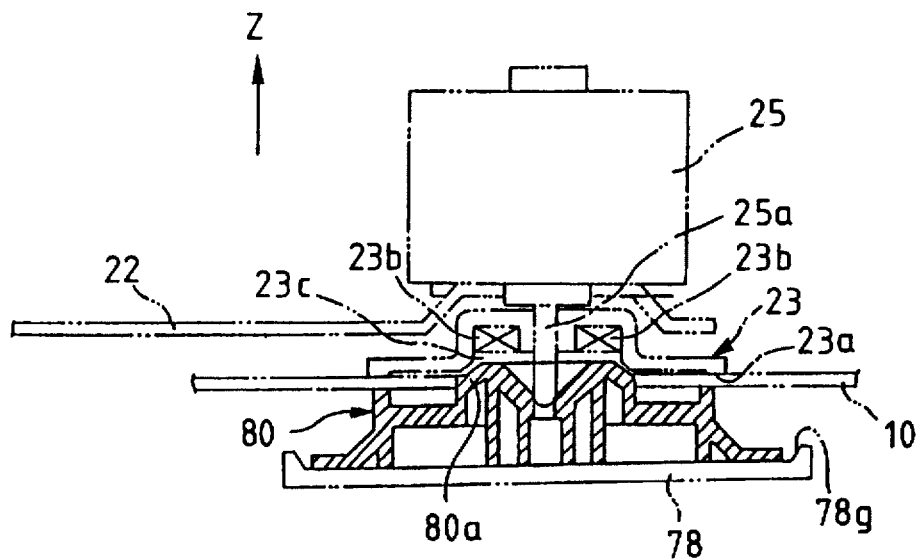

As shown in FIG. 9, a carrying plate 22 serving as a retaining member is mounted on the upper surface of the moving member. As shown in FIGS. 8–10, a turntable 23 is mounted on the carrying plate. As shown in FIG. 9, a carriage 24 carrying an optical pickup means is arranged on the carrying plate 22 and mounted on the carrying plate 22 so as to be movable in the right-and-left directions (the X direction and the direction opposite thereto) along a plane containing the disc-carrying surface 23a (refer to FIG. 10) of the turntable 23. The turntable 23 is directly driven by a spindle motor 25 shown in FIGS. 8–10. A carriage driving means (not shown) including a carriage motor for driving the carriage 24 is provided on the carrying plate 22.

The aforementioned turntable 23, spindle motor 25, and carriage 24 including optical pickup means and carriage driving means make up the disc playing means. The playing means is carried on the moving member 18 acting as a carrying member and moved in the up-and-down directions together with the moving member.

As shown in FIG. 10, the turntable 23 is provided with a magnet 23b for giving a clamping force to a disc-shaped press member of a clamping mechanism which will be described later. The carrying member 22 serves as a retaining member for retaining the spindle motor 25 and the turntable 23 and is formed of a magnetic material and arranged in a side of the turntable 23 opposite to the disc-carrying surface thereof as shown clearly-in FIG. 10. Accordingly, the turntable 23 is attracted toward the carrying plate 22 through the magnetic force of the magnet 23b, so that the output shaft 25a of the spindle motor 25 and a shaft bearing portion (not shown) supporting the output shaft approach each other.

Figure 11:
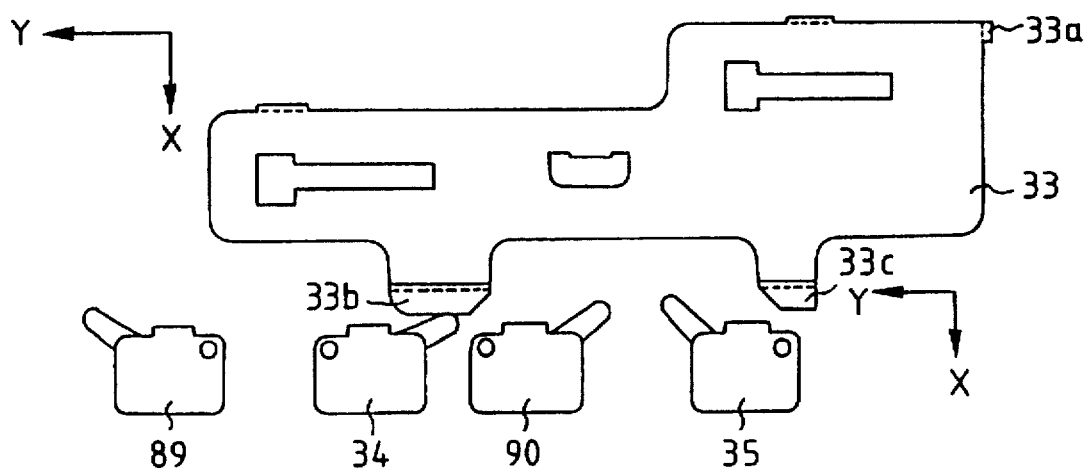
Figure 12:
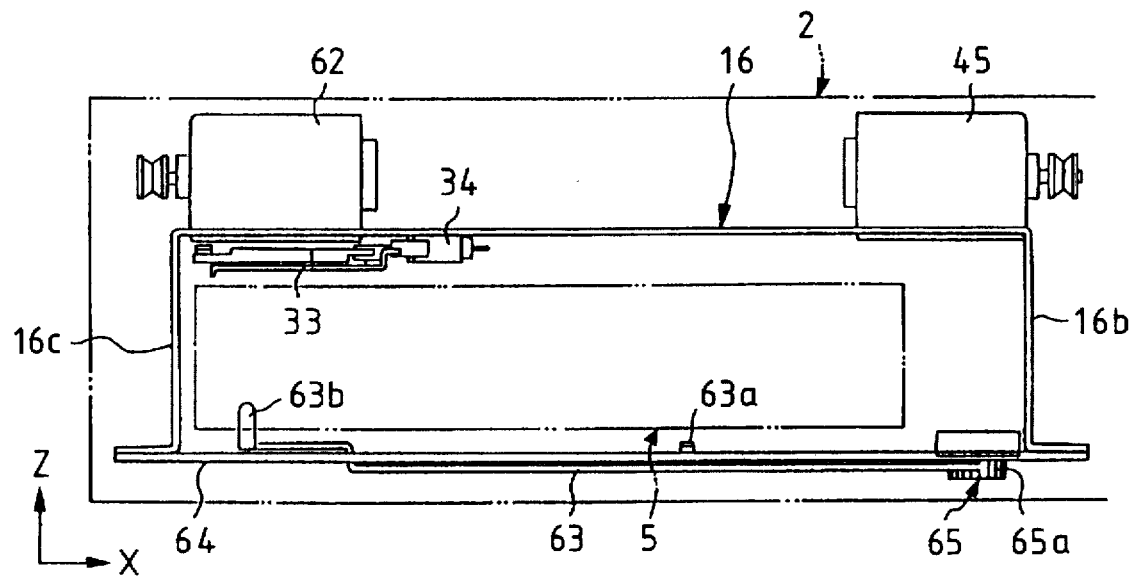

As shown in FIGS. 11 and 12, a moving lever 33 formed of a steel plate is mounted on the lower surface of the chassis 16 so as to be movable along the front-and-rear directions (the Y direction and the direction opposite thereto). The details of the moving lever 33 are shown in FIGS. 13(a) and 13(b).

Figure 13B:
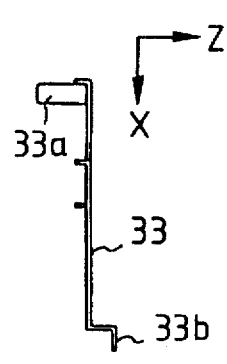
Figure 13A:
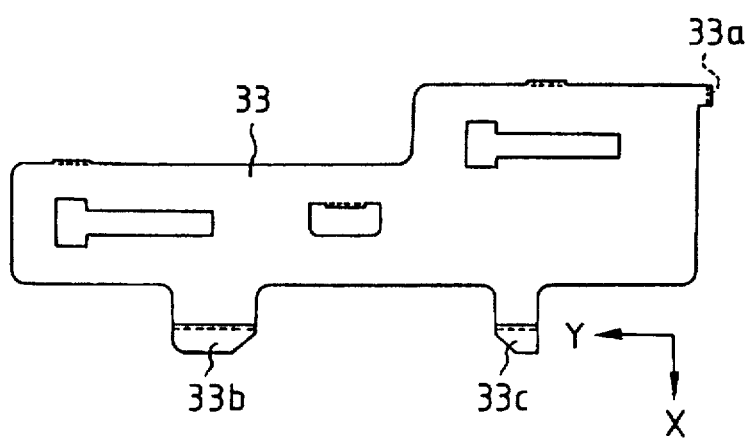

It is apparent from FIGS. 13(a) and 13(b) that an overhang 33a capable of extending downward to engage with the rear end portion of the magazine 5 is provided on the rear end portion of the moving lever 33. In other words, the rear end portion of the magazine 5 can be engaged with the overhang 33a to thereby move back the moving lever 33. A coiled spring (not shown) for giving a forward (the Y direction) biasing force to the moving lever is connected to the moving lever 33.

As shown in FIGS. 6-11, a pair of detection switches 34 and 35 are arranged in the right side of the moving lever 33 so that the actuators can be operated through the engagement with overhang portions 33b and 33c {refer to FIG. 13(a)} of the moving lever movable forward and backward.

The aforementioned moving lever 33 and detection switches 34 and 35 make up magazine loading detection means for detecting the loading of the magazine 5 in the magazine loading portion in the player housing 2.

A moving member moving means for moving the moving member 18 in the up-and-down directions (the Z direction and the direction opposite thereto) will now be described.

Figure 6:
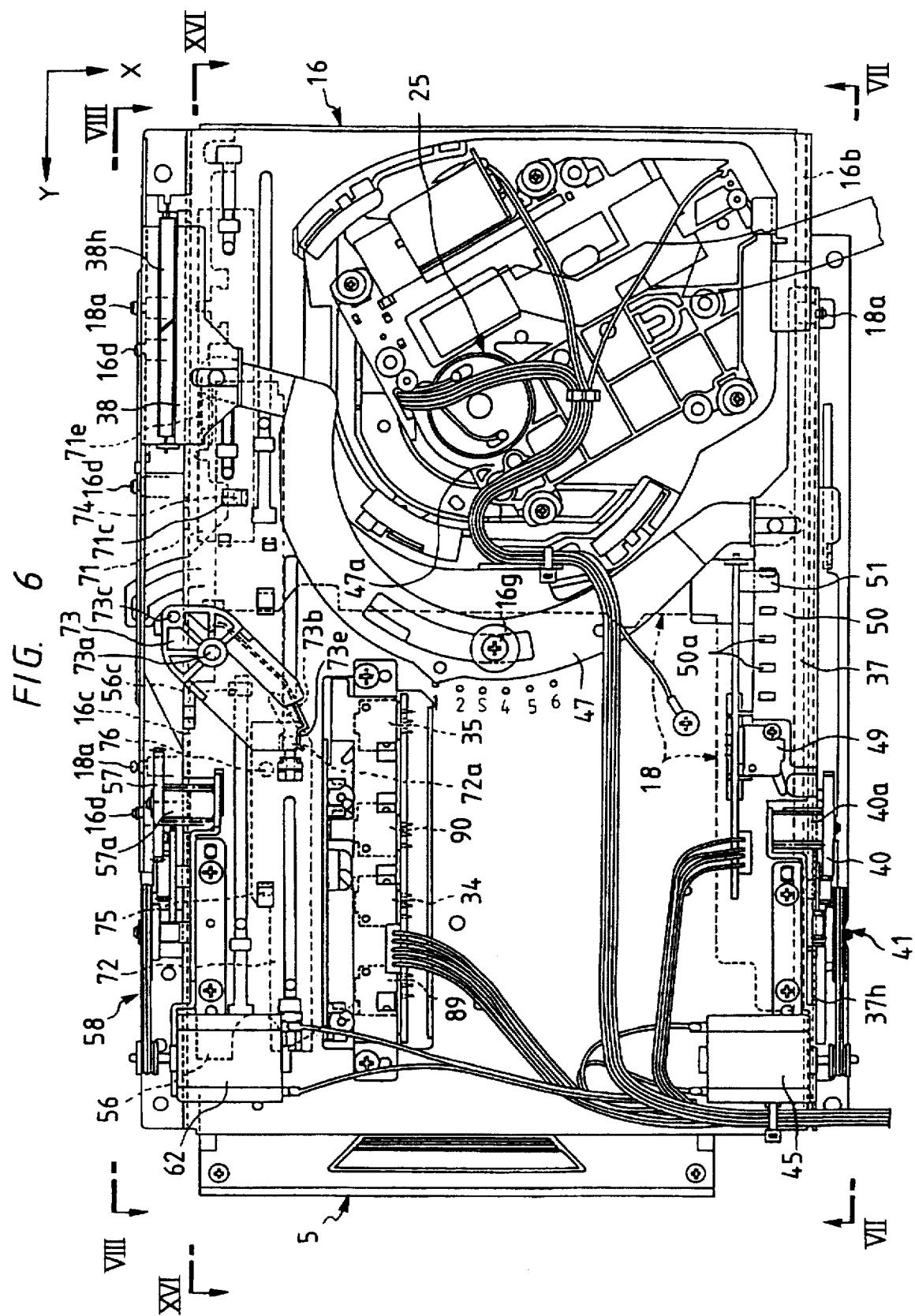
FIG. 6 is a plan view of the inside structure of the multi-disc storage player.
Figure 14:
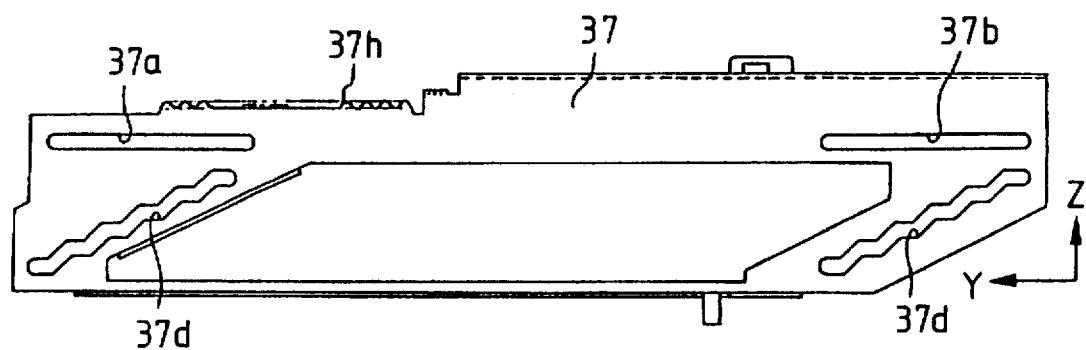
Figure 15:
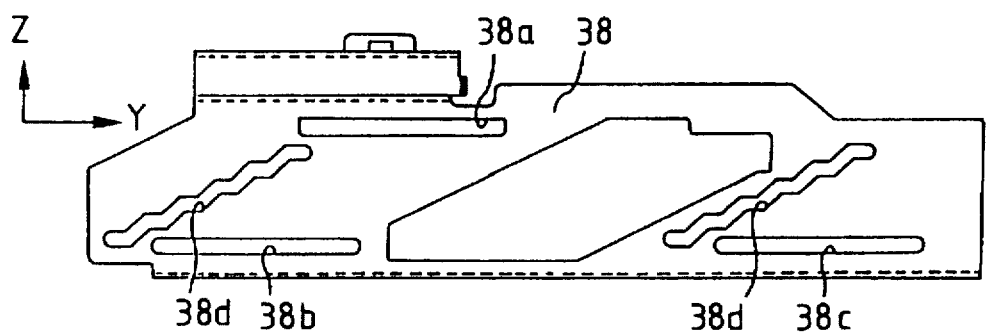

As shown in FIGS. 6-8, a pair of longitudinally movable plates 37 and 38 extending in the front-and-rear directions are provided on the outer surfaces of the right and left elevational portions 16b and 16c of the chassis 16. The details of the moving plates 37 and 38 are shown in FIGS. 14 and 15. It is particularly apparent from FIGS. 7 and 8 that guide grooves 37a and 37b; and 38a–38c, which extend in the direction of extension of the moving plates, are formed in the moving plates 37 and 38, respectively. The guide grooves are movably disposed on pins 16d provided on the outside of the elevational portions 16b and 16c, thereby pivotally mounting the moving plates 37 to the chassis 16 as a supporting member. In short, the moving plates 37 and 38 are capable of reciprocating freely in the front-and-rear directions.

As shown in FIGS. 6-9, the moving member 18 has four pins 18a; two pins arranged in the left side portion, the other two pins arranged in the right side portion. It is apparent from FIGS. 7 and 8 that the pins are movably disposed in four guide grooves 16e vertically extending in the right and left elevational portions 16b and 16c of the chassis 16, thereby guiding the moving member 18 vertically.

The pins 18a provided on the right and left sides of the moving member 18 project out of the chassis through the guide grooves 16e so that staircase-shaped cam grooves 37d and 38d formed in the moving plates 37 and 38 are movably engaged with the pins 18a, respectively. The cam groove 37d in the moving plate 37 is formed so as to be sloped forward (the Y direction) and downward (the direction opposite to the Z direction) as a whole. The cam groove 38d in the other moving plate 38 is formed so as to be sloped forward and upward as a whole. In other words, the cam grooves 37d and 38d are provided to make the moving member 18 move vertically when the moving plates 37 and 38 move relatively. As shown in FIGS. 6–8, a coiled spring 38h is connected to the rear end portion of the right moving plate 38 to always urge the moving plate backward (the direction opposite to the Y direction). Accordingly, there is constantly no space between the cam groove 38d formed in the moving plate 38 and the pin 18a being in contact with the cam groove, so that the vertical movement of the moving member 18 can be made with high accuracy.

As shown in FIGS. 6, 7 and 14, a rack portion 37h is formed in the front end portion of the right moving plate 37 so as to be arranged along the direction of extension of the moving plate. It is apparent from FIGS. 6 and 7 that a small gear portion 40a in a double gear 40 provided on the chassis 16 and formed by uniting two different gears engages with the rack portion 37h. The moving plate 37 is driven by a motor 45 through a reduction gearing mechanism 41 including the double gear 40.

As shown in FIG. 6, a turnlever 47 is arranged between the right and left moving plates 37 and 38 and pivotally mounted on the chassis 16 through a pin 16g provided on the chassis 16, so that the turnlever 47 is capable of turning on a virtual center 47a. The turnlever 47 is pivoted, at its opposite ends, to the right and left moving plates 37 and 38, so that a moving plate 38 can be driven synchronously to the moving plate 37.

The aforementioned motor 45, reduction gearing mechanism 41, turnlever 47 and other small members related thereto make up a driving mechanism for giving driving force to the moving plates 37 and 38 to move the moving member 18 which mounts the playing means. The driving mechanism makes the moving member move according to a movement instruction issued from a control portion which will be described later.

As shown in FIG. 6, a detection switch 49 is provided in the upper portion of the left elevational portion 16b of the chassis 16. The detection switch 49 is provided to detect the fact that the moving plate 37 moving front and back is in the furthest-returned position (forward motion limit position). The detection switch 49 is operated by the engagement of part of the moving plate 37 with the actuator thereof. An address plate 50 having six slits 50a arranged along the direction of movement of the moving plate 37 is provided in the left surface of the front end portion of the moving plate 37. A photosensor 51 is provided in the rear of the detection switch 49 to detect the slits of the address plate. Hereinafter the detection switch 49 is referred to as "first sensor" and the photosensor 50 is referred to as "second sensor." A slit detection signal obtained from the second sensor is fed to a counter (not shown) for counting the slit detection signal. A control portion for performing automatic control of the multi-disc storage player is arranged in a predetermined position in the player housing 2 and determines the stop position of the movable plate 37 based on the count value of the counter.

In the case where the aforementioned control portion should issue a movement instruction to the aforementioned driving mechanism while the slit detection signal is generated from the photosensor 51 acting as a second sensor, the control portion continues to issue the movement instruction if the designated position of the moving member 18 corresponding to a disc designated by a playing instruction does not coincide with the current position thereof. In the case where a movement instruction should be issued while the slit detection signal is not generated from the photosensor 51, the control portion continues to issue the movement instruction if the detection signal from the detection switch 49 acting as a first sensor is not obtained, and then the control portion issues the movement instruction to make the designated position of the moving member 18 coincide with the current position thereof.

As shown in FIG. 9, a tray engagement member 53 is provided in the left front end portion of the moving member 18 and capable of engaging with a desired one of the trays 11 and 12 {refer to FIG. 2(b)} in the magazine 5 to project the desired tray out of the magazine body 8. The tray engagement member 53 is substantially L-shaped and has a slidable pin 53a capable of engaging with an arc-like guide groove 18d formed in the moving member 18. In short, the tray engagement member 53 rotates on the center of curvature of the arc-like guide groove 18d as a rotation axis to press the trays 11 and 12 at the rotation end portions 53b and 53c thereof to thereby project and retract the trays 11 and 12 with respect to the magazine body 8. It is apparent from FIG. 9 that the position of the virtual rotation shaft (center of curvature of the arc-like guide groove) of the tray engagement member 53 is made to coincide with that of the rotation supporting shaft 8a of the trays 11 and 12. The trays 11 and 12 can be projected out of the magazine body 8 by pressing the portions 11k and 12k of the trays 11 and 12 {refer to FIGS. 4(a) 5(a)} for rotation about supporting shaft 8a by means of the tray engagement member 53. As shown in FIG. 9, starting and ending portions 18e and 18f of the arc-like guide groove 18d extend substantially perpendicularly to the direction P of driving force given to the tray engagement member 53 by the tray engagement member driving means which will be described later.

The tray engagement member driving means for rotationally driving the tray engagement member 53 to project the trays 11 and 12 out of the magazine body 8 will now be described.

Figure 16:
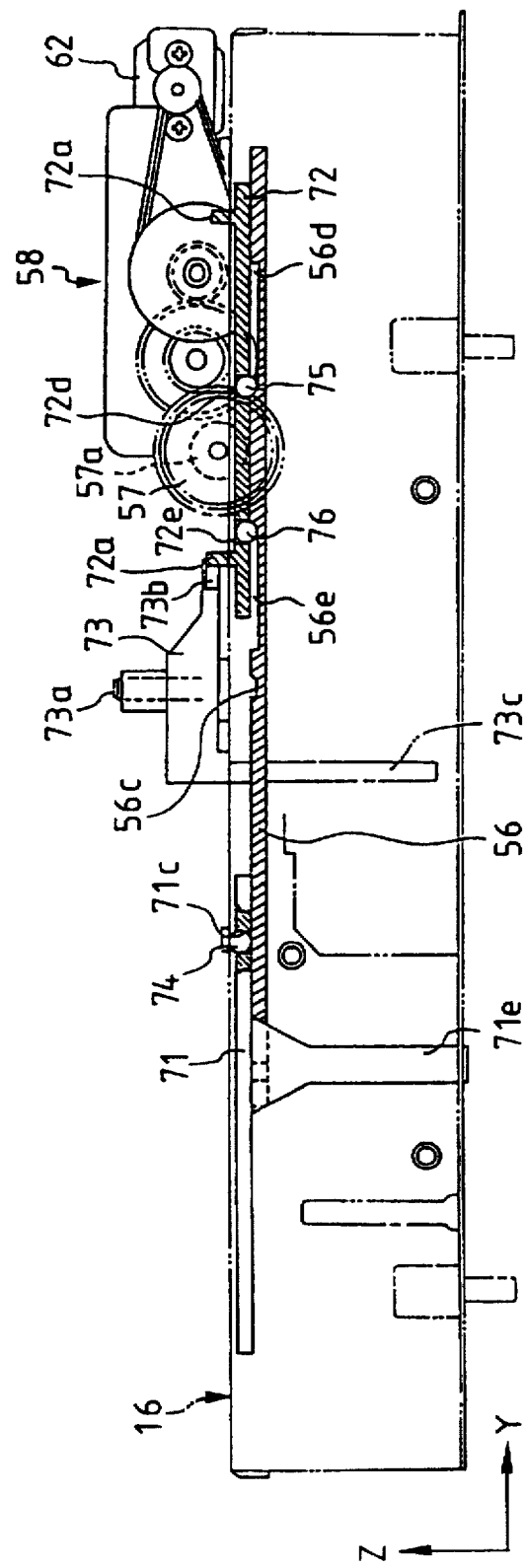
FIG. 16 is a sectional view taken along the line XVI—XVI in FIG. 6.
Figure 19A:
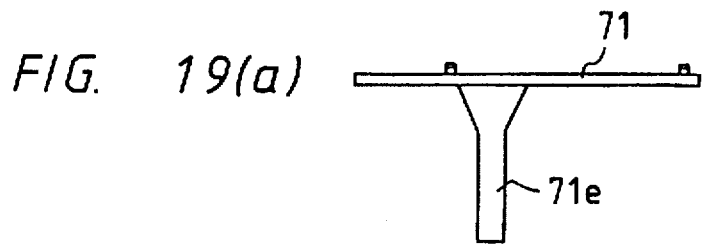
Figure 19B:
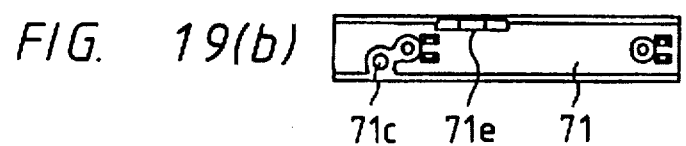
Figure 20A:
Figure 20B:
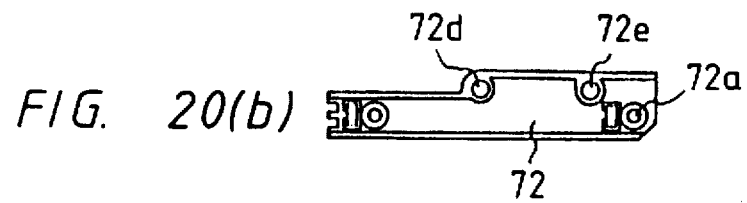

As shown in FIGS. 6 and 16, a moving body 56 extending in the front-and-rear directions is arranged in the lower surface of the left side of the chassis 16 and mounted on the chassis 16 so as to be movable in the direction of extension thereof. The details of the moving body 56 are shown in FIGS. 17(a)–17(d). A rack portion 56a is formed in the left front end portion of the moving body 56 so as to be arranged along the direction of extension of the moving body. A small gear portion 57a of a double gear 57 (refer to FIGS. 6 and 8) provided on the chassis 16 engages with the rack portion 56a. The moving body 56 is driven by a motor 62 through a reduction gearing mechanism 58 including the double gear 57. The reduction gear mechanism 58 and motor 62 form a driving force producing means for imparting driving force to the moving body 56.

As shown in FIGS. 12 and 18, a swinging lever 63 extending substantially in the right-and-left directions and serving to project the magazine 5 out of the magazine mounting portion is arranged in the vicinity of the deepest portion of the magazine mounting portion in the player housing 2 and pivotally mounted, through a pin 63a, on the substantially middle portion of a sub-chassis 64 provided in the lower portion of the chassis 16. The pin 63a extends vertically (in the Z direction and the direction opposite thereto). It is apparent from the drawing that an overhang 63b extending upward is provided in the left end portion of the swinging lever 63. The overhang 63b of the swinging lever 63 is in contact with the rear end portion of the magazine 5. A gear portion 63c using the pin 63a as the center of the curvature thereof is formed in the right end portion of the swinging lever 63. A control gear 65a (shown in FIG. 12) in a damper 65 engages with the gear portion 63c. The damper 65 gives control power through viscosity resistance of a viscous matter such as grease contained in the inside thereof. As shown in FIG. 18, a magazine projecting force is given to the swinging lever 63 by a coiled spring 63d.

The aforementioned swinging lever 63, clamper 65 and coiled spring 63d make up projecting means for projecting the magazine out of the magazine mounting portion of the player housing 2.

As shown in FIG. 8, a locking member 67, for locking the magazine 5 in the loading position with respect to the player housing by engagement of the rotational end portion thereof with a U-shaped stoppage portion 5g {refer to FIGS. 2(b) and 2(c)} of the magazine 5, is pivotally provided in the left elevational portion 16c of the chassis 16. The locking state of the magazine 5 by the locking member can be released by the forward movement of the moving body 56.

As shown in FIGS. 6 and 16, first and second lever members 71 and 72 each extending in the front-and-rear directions (the Y direction and the direction opposite thereto) are arranged in the left end portion of the chassis 16 and mounted on the chassis 16 so as to be movable in the directions of extension thereof. The details of the first and second lever members 71 and 72 are shown in FIGS. 19(a), 19(b), 20(a) and 20(b). The first lever member 71 serves to drive a support as a constituent member of a clamping mechanism which will be described later. The second lever member 72 serves to rotationally drive the tray engagement member 53 (refer to FIG. 9) through an intermediate lever 73 (shown in FIGS. 6 and 16).

The intermediate lever 73 is pivotally disposed on the chassis 16 through a pin 73a extending vertically and capable of being rotated by the engagement with a pin 72a disposed on the second lever member 72 with a cam groove 73b formed in the rotational end portion thereof (shown in FIGS. 6 and 16). A rod 73c extending downward is provided in the rotational other end portion of the intermediate lever 73. The rod 73c is inserted into a hole 53d formed in the tray engagement member 53 (shown in FIG. 9), thereby rotating the tray engagement member 53. As shown in FIG. 6, the intermediate lever 73 is provided with a leaf spring 73e for keeping the pin 72a in contact with the cam groove 73b.

The cam groove 73b is formed so that the tray engagement member can be separated from the respective trays 11 and 12, after the trays are stored in the magazine body 8 by pressing of the tray engagement member 53.

The first and second lever members 71 and 72 are both moved by the aforementioned moving body 56.

As shown in FIGS. 6, 16, 17(a) and 17(c), a first portion 56c having a U-shaped cross section is provided in a predetermined position of the moving body 56. On the contrary, as shown in FIGS. 6 and 16, a first opening portion 71c capable of being placed opposite to the first portion 56c is provided in the first lever member 71. A movable piece 74 capable of being engaged with the first portion 56c is provided in the first opening portion. The first portion 56c, first opening portion 71c, movable piece 74 and the like make up locking and unlocking means for suitably locking and unlocking the first lever member 71 relative to the moving body 56 corresponding to the movement of the moving body. In short, the first lever member 71 suitably moves together with the moving body 56 and suitably stops corresponding to the distance of movement of the moving body 56 to thereby drive the clamping means which will be described later. The details of the aforementioned locking and unlocking means are described in Japanese Patent Application No. 59-29309.

On the other hand, as shown in FIGS. 6, 16, 17(a) and 17(c), other second and third portions 56d and 56e having U-shaped cross sections are formed in the moving body 56, whereas second and third opening portions 72d and 72e capable of being placed opposite to the second and third portions 56 and 56e are formed in the second lever member 72. Two movable pieces 75 and 76 are disposed between the second and third portions 56d and 56e and the second and third opening portion 72d and 72e. The second and third portions 56d and 56e, second and third opening portions 72d and 72e, movable pieces 75 and 76 and the like make up locking and unlocking means for suitably locking and unlocking the second lever member 72 relative to the moving body 56 corresponding to the movement of the moving body 56. In short, the second lever member 72 suitably moves together with the moving body 56 and suitably stops corresponding to the distance of movement of the moving body 56 to thereby drive the tray engagement member 53 (refer to FIG. 9).

The details of the aforementioned locking and unlocking means are described in Japanese Patent Application No. 60-72908.

The aforementioned locking and unlocking means, second lever member 72, moving body 56 and driving force producing means including the motor 62 and serving to impact driving force to the moving body 56 make up tray engagement member driving means for rotationally driving the tray engagement member 53 (shown in FIG. 9) to project and retract the trays 11 and 12 (refer to FIGS. 4 and 5) relative to the magazine body 8. In short, the tray engagement member driving means serves as a disc moving means for moving discs between the playing means including the turntable and the magazine 5 as a disc storage portion. On the other hand, the tray engagement member driving means, chassis 16 acting as a supporting member, moving member 18, tray engagement member 53, moving plates 37 and 38 and the like make up tray projection means for projecting a tray 11 and 12 carrying a disc 10 to be played out of the magazine body 8.

As shown in FIGS. 9 and 21-23, a pair of plate-like supports 78 and 79 extending respectively in the front-and-rear directions (the Y direction and the direction opposite thereto) and in the right-and-left directions (the X direction and the direction opposite thereto) are provided on the moving member 18 and mounted on a bracket portion 18f (formed on the moving member 18) so that each of the supports 78 and 79 can move in a plane substantially perpendicular to the disc-carrying surface 23a (shown in FIG. 10) of the turntable 23 (refer to FIGS. 8, 10, etc.) through pins 78a and 79a acting as supporting shafts. The details of the supports 78 and 79 are shown in FIGS. 24 and 25. A disc-shaped pressing member 80 for performing a disc clamping action together with the turntable while abutting on the surface of the disc 10 reverse to the surface facing the turntable 23 is rotatably mounted on the free ends of the supports 78 and 79. More specifically, the free end of the support 78 is in contact with the disc pressing side of a flange 81a formed in the pressing member 80 and, on the other hand, the free end of the support 79 is in contact with the side reverse to the disc pressing side of the flange 81a, so that the pressing member 80 is vertically clamped between the free ends of the supports 78 and 79.

Figure 22:
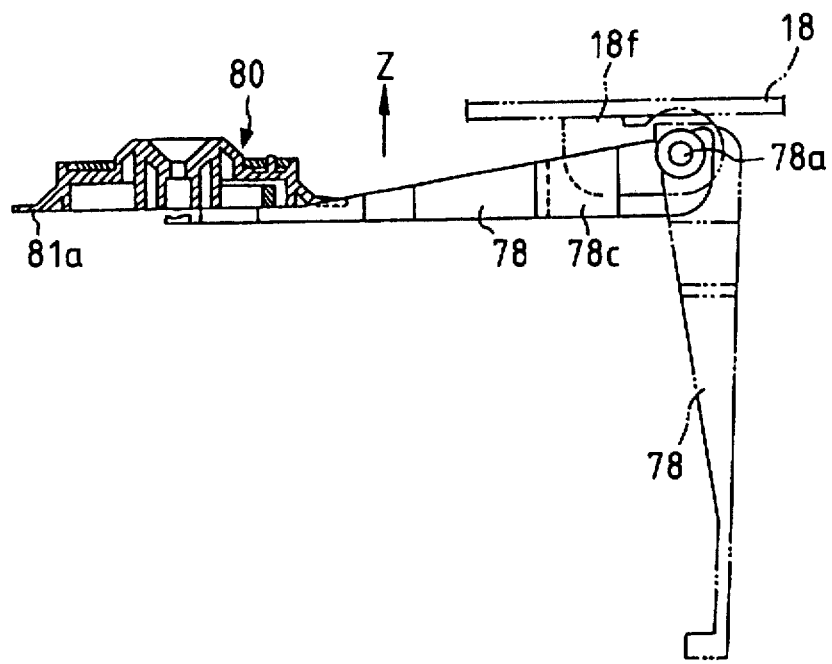
Figure 23:
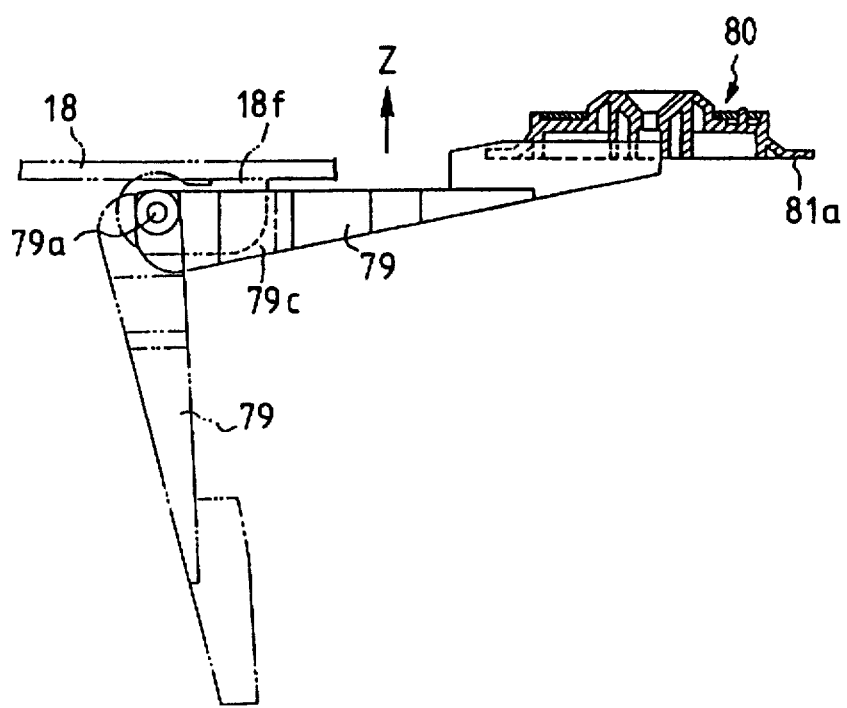
Figure 24:
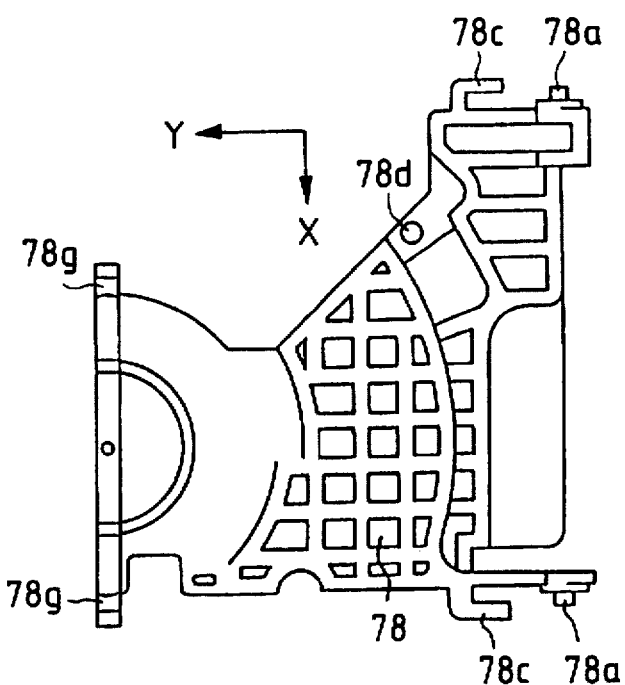
Figure 25:
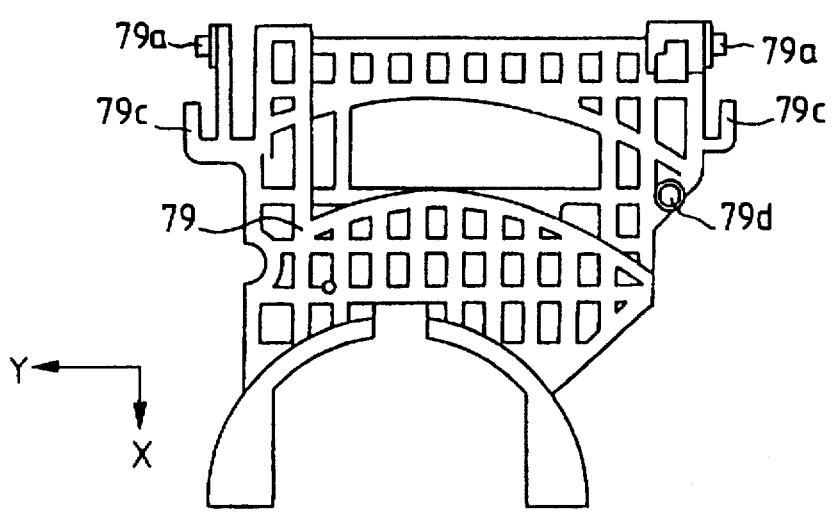
Figure 28:
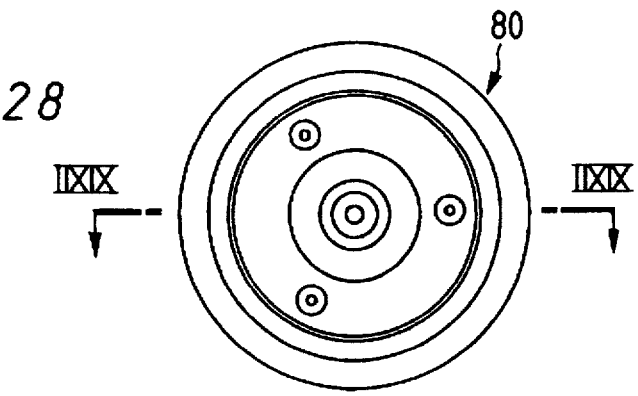
Figure 29:
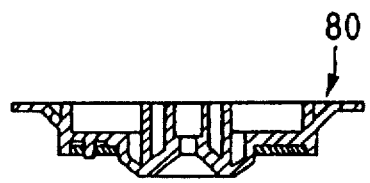

As shown in FIGS. 21-25, the supports 78 and 79 are provided with limiting portions 78c and 79c which are engaged with the bracket portion 18f of the moving member 18 when the supports are in the positions designated by the solid line in FIGS. 22 and 23, to thereby limit the movement of the supports in directions parallel to the directions of extension of the pins 78a and 79a. The positions of the supports designated by the two-dotted chain line in FIGS. 22 and 23 are positions when the supports are mounted on the bracket 18f. The positions of the supports designated by the solid line in FIGS. 22 and 23 are positions when the supports perform their functions. In short, the positions designated by the solid line are active positions, whereas the positions designated by the two-dotted chain line are inactive positions.

It is apparent from FIGS. 9 and 21 that a clamper cam 82 shaped liked an arch is arranged in the upper of the supports 78 and 79 and pivotally mounted, through a pin 82a, to the moving member 18 (refer to FIG. 9) so as to be movable around the curvature center thereof. The details of the clamper cam 82 are shown in FIGS. 26(a)-26(c) and FIG. 27. It is particularly apparent from FIGS. 26(c) and 27 that cam portions 82d and 82e capable of engaging with the cylindrical projections 78d and 79d (shown in FIG. 21) provided on the upper surfaces of the supports 78 and 79 are formed in substantially the middle of the clamper cam 82. Accordingly, the supports 78 and 79 are driven through the reciprocating motion of the clamper cam 82, so that attachment and detachment of the pressing member 80 with respect to the turntable 23 can be made. The cam portions 82d and 82e are formed so that the supports 78 and 79 are detached from the pressing member 80 after the pressing member 80 is attracted to the turntable 23; on the other hand, the pressing member is detached from the turntable 23 after the clamping of the pressing member 80 by the supports is completed.

As shown in FIGS. 21, 26(a) and 26(c), a U-shaped notch portion 82f is formed in one end of the clamper cam 82 and is smoothly engaged with a projection 71e which is formed in the first lever member 71 {shown in FIGS. 6, 16 and 19(a) and 19b)} so as to extend downward. The clamper cam 82 is moved through the reciprocating motion of the first lever member 71, so that the supports 78 and 79 move vertically.

The aforementioned clamper cam 82, first lever member 71, moving body 56 (shown in FIG. 17, etc.), locking and unlocking means (including the movable piece 74 and the like) for suitably locking and unlocking the first lever member 71 and the moving body 56 corresponding to the movement of the moving body, and driving force producing means (including the motor 62 and the like) for imparting a driving force to the moving body 56 make up driving means for driving the supports 78 and 79. Further, the driving means and the supports 78 and 79 make up pressing member moving means for attaching and detaching the pressing member 80 with respect to the turntable 23. Further, the pressing member moving means and the pressing member 80 make up a clamping mechanism for clamping the disc 10. As shown in FIGS. 22 and 23, a spring member (not shown) is provided to urge the supports 78 and 79 to thereby swing the pressing member 80 toward the disc-carrying surface 23a (refer to FIG. 10) of the turntable 23.

FIG. 10 is a sectional view taken along the line X—X in FIG. 21. It is apparent from the drawing that a tapering portion 78g is formed in the free end portion of the support 78 and that the tapering portion 78g is engaged with the outside (of a flange or body 81a) of the pressing member 80 to perform positioning of the pressing member, particularly in this embodiment, to perform positioning of the pressing member in a plane parallel to the disc-carrying surface 23a of the turntable 23. Accordingly, the centering of the pressing member 80 relative to the turntable 23 is made with high accuracy.

Here, the form of the turntable 23 and the pressing member 80 will now be described.

It is apparent from FIG. 10 that the pressing member 80 is provided with a disc centering projection 80a fitted into the center hole of the disc 10 to perform centering of the disc. On the other hand, the turntable 23 is provided with a cavity 23c into which the disc centering projection is fitted at the time of disc clamping. According to the aforementioned construction, the divergence of the disc 10 with respect to the directions parallel to the disc-carrying surface 23a of the turntable 23 is prevented.

The aforementioned clamping mechanism serves to move the disc 10 carried on a tray 11 or 12 projected out of the magazine body 8 by the tray projection means, in a direction perpendicular to the disc-carrying surface 23a (refer to FIG. 10) of the turntable 23, particularly in this embodiment, upward (in the Z direction).

Figure 30:
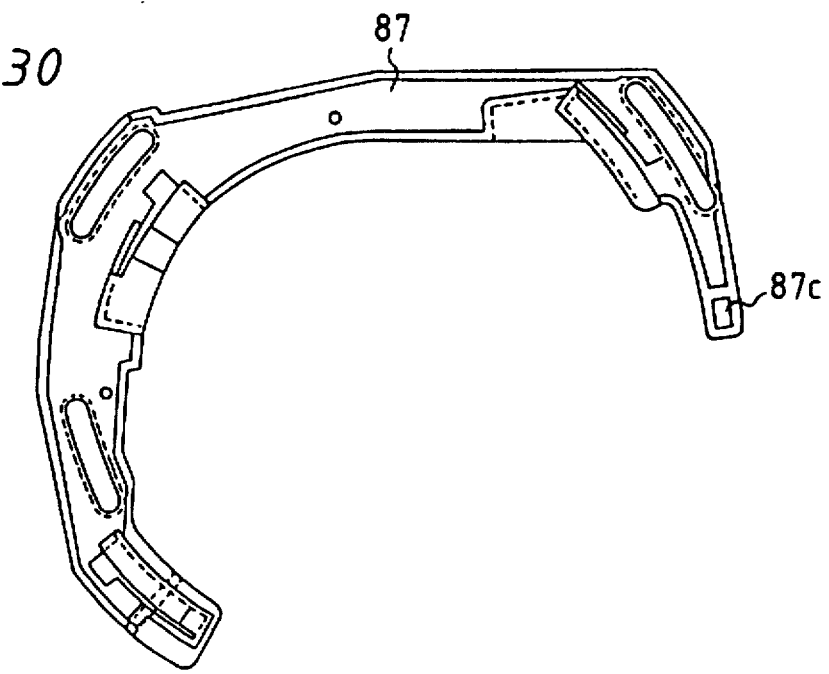
Figure 31A:
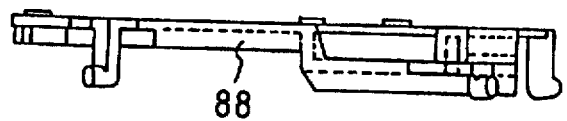
Figure 31B:
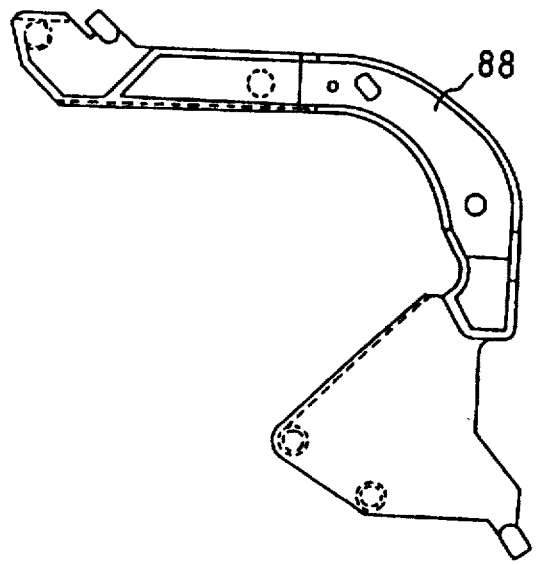

As shown in FIG. 9, a disc pressing member driving cam 87 substantially shaped like an arch is provided on the moving member 18 and mounted on the moving member 18 so as to be movable through a pin 87a around the center of curvature thereof. The details of the disc pressing member driving cam 87 are shown in FIG. 30. As shown in FIGS. 9 and 30, an opening portion 87c is provided in one end portion of the disc pressing member driving cam 87. A pin 82h {refer to FIGS. 9, 26(a) and 26(b)} extending upward at the end portion of the clamper cam 82 is smoothly fitted into the opening portion 87c. In short, the disc pressing member driving cam 87 moves corresponding to the movement of the clamper cam 82. The disc pressing member driving cam 87 abuts on the surface opposite to the disc-carrying surface, of the disc moved by the clamping mechanism perpendicularly (up-and-down directions) to the disc-carrying surface 23a (refer to FIG. 10) of the turntable 23 from the tray 11 or 12, thereby driving the disc pressing member 88 {shown in FIGS. 31(a) and 31(b)} keeping the disc 10 parallel relative to the disc-carrying surface. In short, the disc pressing member driving cam 87 is arranged so that when the cam 87 moves along the curvature thereof, the disc pressing member 88 moves vertically while kept in contact with the disc.

As shown in FIGS. 6 and 11, two detection switches 89 and 90, other than the detection switches 34 and 35, are mounted on the chassis 16 so as to be parallel to the detection switches 34 and 35. The detection switches 89 and 90 serve to detect the moving position of the moving body 56 through the engagement with the moving body 56 driven by the motor 62.

The aforementioned control portion detects, from a detection signal generated by the detection switch 89, the fact that the respective tray 11, 12 in the magazine 5 is stored in the magazine body 8. From a detection signal generated by the other detection switch 90, the control portion detects the fact that the respective tray 11, 12 is projected out of the magazine body 8 and that the disc on the tray is clamped relative to the turntable.

Figure 32A:
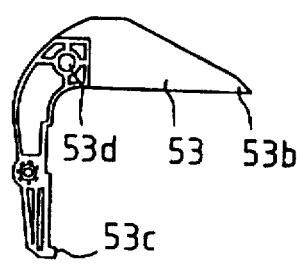
Figure 32B:
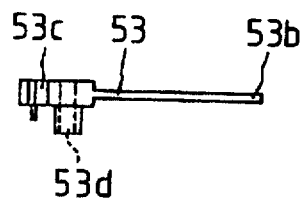
Figure 33A:
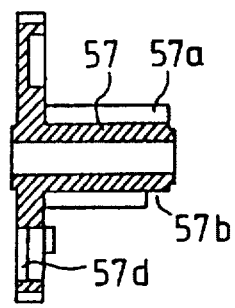
Figure 33B:
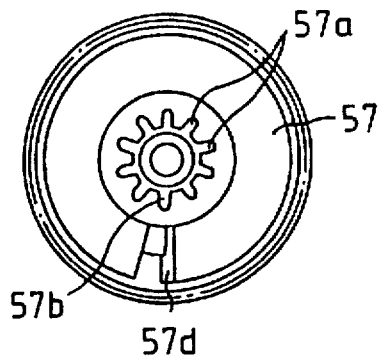

FIGS. 32(a) and 32(b) show the details of the aforementioned tray engagement member 53. FIGS. 33(a) and 33(b) show the details of the gear 57 engaged with the rack portion 56a {refer to FIGS. 17(a), 17(b) and 17(d)} of the moving body 56 (refer to FIGS. 6, 16 and 17). The gear 57 is formed by uniting a large gear portion (no reference numeral) and a small gear portion 57a, the small gear portion 57a engaged with the rack portion 56a.

As shown in FIGS. 33(a) and 33(b), the small gear portion 57a of the gear 57 has a notch portion 57b formed by cutting one tooth of the gear. On the other hand, as shown in FIGS. 17(a), 17(b) and 17(d), the rack portion 56a of the moving body 56 engaged with the small gear portion 57a has two projections 56g corresponding to the notch portion 57b. Accordingly, when, for example, the small gear portion 57a of the gear 57 and the rack portion 56 are engaged with each other at the time of assembling of the disc player, the gear 57 and the moving body 56 are constructed so that they cannot be operated if the notch portion 57b is not adjusted between the projections 56g.

Figure 34A:
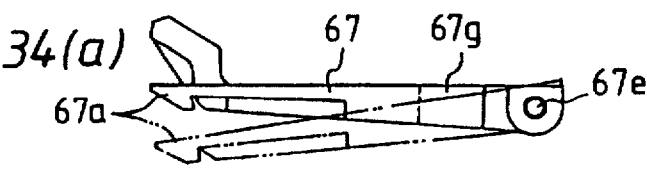
Figure 34B:
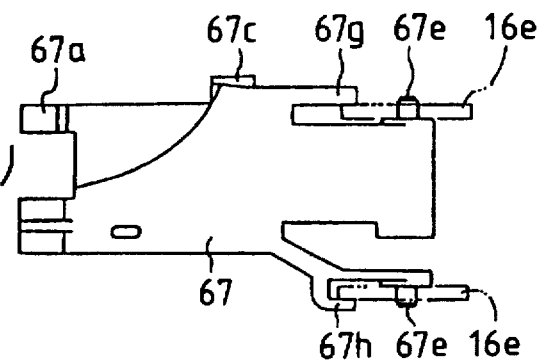
Figure 34C:
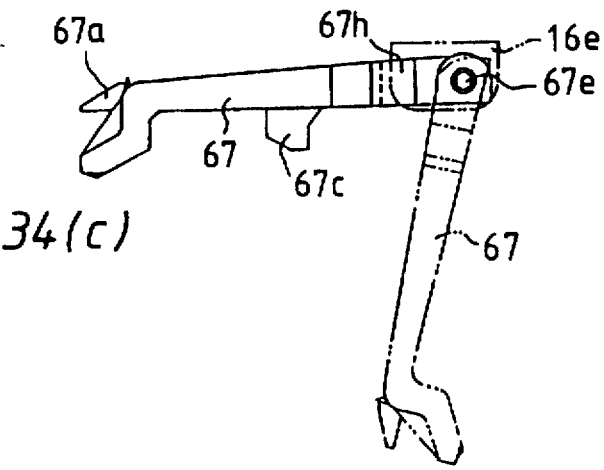

FIGS. 34(a)–34(c) show the details of the locking member 67 (shown in FIG. 8) for locking the magazine in the mounting position relative to the player housing 2 through the engagement of the claw 67a thereof with the U-shaped stoppage portion 5g {refer to FIGS. 2(b) and 2(c)} of the magazine 5.

The locking member 67 can move between a first position designated by the two-dotted chain line in FIG. 34(a) and a second position designated by the solid line. The first position is a position where the magazine is locked and the second position is a position where the locking state of the magazine is released. Though not shown, a spring member acting as a locking member urging means is provided to engage the claw 67a of the locking member 67 with the U-shaped portion 5g of the magazine 5.

As shown in FIGS. 34(b) and 34(c), a projection 67c is formed on the side of the locking member 67. The projection 67c is engaged with the cavity 57d formed in the gear 57 as shown in FIG. 33 when the locking member is in the vicinity of the second position, thereby limiting the rotation of the gear.

As shown in FIGS. 8 and 34(b), the locking member 67 is rotatably mounted by inserting the pin 67e thereof into an insertion hole (no reference numeral) of the bracket portion 16e provided in the elevational portion 16c of the chassis 16.

As shown in FIGS. 34(a)–34(c), the locking member 67 is provided with limiting portions 67g and 67h for limiting the movement of the locking member in directions parallel to the direction of extension of the pin 67e through the engagement with the bracket portion 16e when the locking member is in the position designated by the solid line in FIG. 34(c). The position of the locking member 67 designated by the two-dotted chain line in FIG. 34(c) is a position where the locking member is mounted on the bracket portion 16e, whereas the position designated by the solid line is a position where the locking member performs its locking function.

Figure 35:
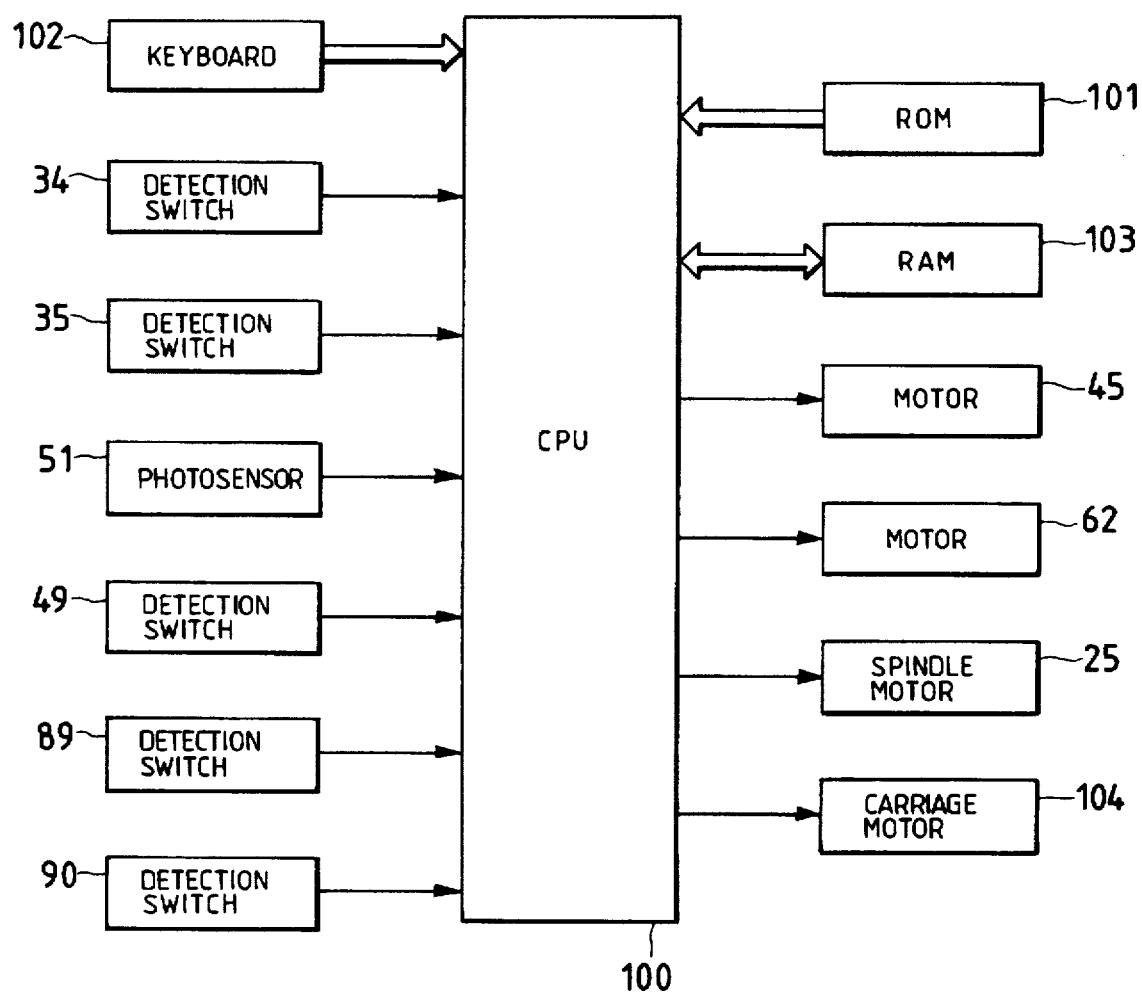
FIG. 35 is a block diagram of a control system in the multi-disc storage player depicted in FIGS. 1–34.

FIG. 35 shows the construction of the control portion for controlling the operation of the multi-disc storage player constructed as described above. In the drawing, a CPU 100 gives instructions to the motors 45 and 62, spindle motor 25 and carriage motor 104 cooperatively with an RAM 103 corresponding to signals from a keyboard 102 composed of the detection switches 34, 35, 49, 89 and 90, the photosensor 51 and the operation portion 6 (refer to FIG. 1) in accordance with the control program stored in an ROM 101 in advance.

An example of the control program will now be described with reference to the flowchart in FIG. 36 and the operational explanatory views in FIGS. 37(a), 37(b) and 38.

Figure 36:
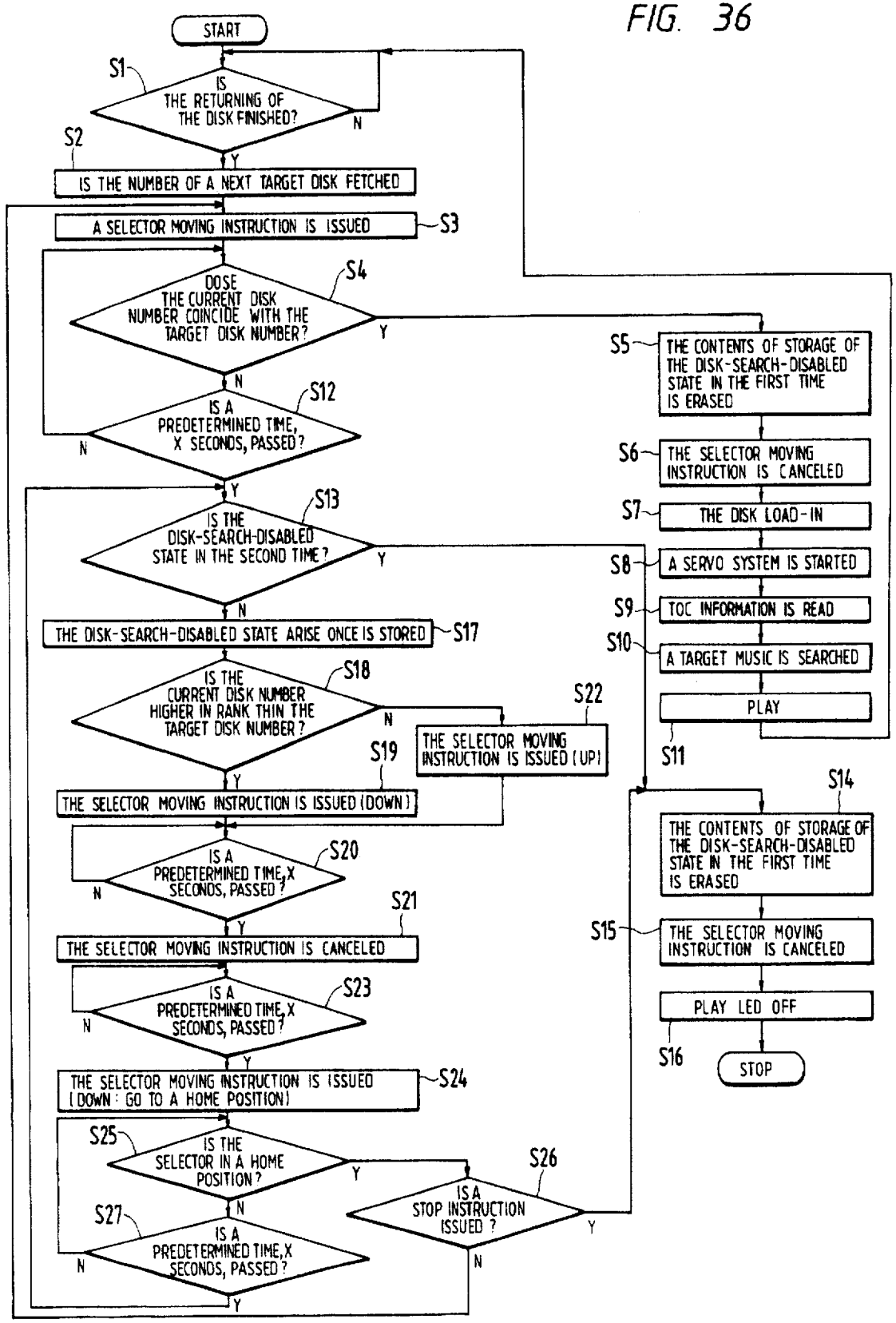
FIG. 36 is a flow chart for explaining the operation of the multi-disc storage player depicted in FIGS. 1–34.
Figure 37A:
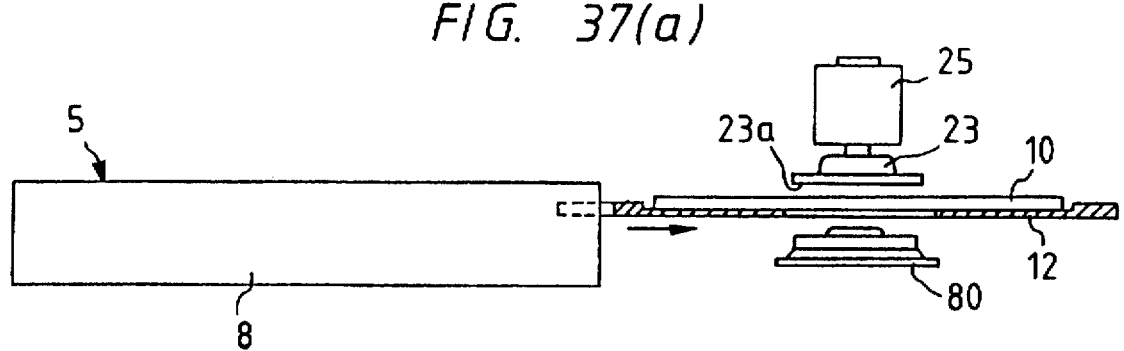
FIGS. 37(a) and 37(b) and 38 are views for explaining the operation of the inner mechanism of the multi-disc storage player depicted in FIGS. 1–34.
Figure 37B:
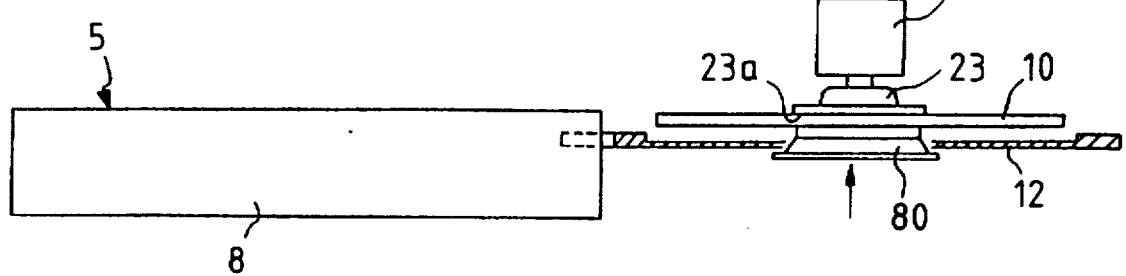

The control program shown by the flowchart in FIG. 36 starts when a disc returning instruction is issued to the motor 62 through a disc playing instruction.

When the disc returning instruction is issued, the reverse rotation of the motor 62 starts to perform a disc clamp releasing operation and a disc returning operation which is reverse to a disc clamping operation and a disc loading-in operation which will be described later, so that the disc on the turntable is returned to the magazine 5. After the returning of the disc is confirmed (Step S1), the number of a next target disc is retrieved (Step S2). Then, a selector moving instruction is issued to move the moving member 18 (having playing means) to a designated position corresponding to the target disc (Step S3). The "selector" is another name for the moving member 18 carrying the playing means.

After the selector moving instruction is issued, the controller checks whether the current disc number coincides with the target disc number or not (Step S4). When the current disc number coincides with the target disc number, one disc searching operation is finished. If the failure of searching is stored, the content of the storage is erased (Step S5) and, at the same time, the selector moving instruction is cancelled (Step S6). Then the rotation of the motor 62 is started to project the designated disc out of the magazine, so that the moving body 56 (shown in FIG. 16, etc.) is driven backward (the Y direction and the direction opposite thereto).

At this time, the moving body 56 is in a locked state in which the moving body 56 is locked with the second lever member 72 by the locking and unlocking means including the movable pieces 75 and 76 (refer to FIG. 16, etc.). The first lever member 71 is not yet locked with the moving body 56. Accordingly, the second lever member 72 alone moves backward together with the moving body. 56, so that the tray engagement member 53 rotates counterclockwise in FIG. 9. Accordingly, as shown in FIGS. 2(b) and 37(a), a tray (for example, tray 12) carrying a disc 10 to be played is projected out of the magazine body 8, so that the disc moves to a concentric position with respect to the disc-carrying surface 23a of the turntable 23, that is to say, the disc moves just under the disc-carrying surface.

Thereafter, the moving body 56 moves further backward (in the direction opposite to the Y direction), but the second lever member 72 is unlocked from the moving body and at the same time the lever member 71 is locked with respect to the moving body.

Accordingly, the first lever member 71 moves backward together with the moving body 56, so that the supports 78 and 79 (shown in FIG. 23, etc.) of the clamping mechanism move upward (in the Z direction). Accordingly, as shown in FIG. 37(b), the disc 10 is lifted upward from the tray 12 by the clamping mechanism and clamped with respect to the turntable 23, so that the disc loading-in operation is finished (Step S7). The confirmation that the disc is clamped on the turntable 23 is based on a detection signal generated by the detection switch 90 as shown in FIGS. 6 and 11 when the detection switch 90 is operated by the moving body 56.

Thus, a playing-enabled state is obtained. The controller starts a servo system such as spindle servo, focusing servo, tracking servo and the like (Step S8), reads TOC information (Step S9), performs searching of a target music (Step S10) and starts playing (Step S11).

On the other hand, when the current disc number does not coincide with the target disc number with the passage of a predetermined time (Step S12) after the selector moving instruction is issued (Step S3), or in other words, when the disc searching operation is enabled, the controller judges whether or not the disc-search-disabled state appears two times inclusive of the present time (Step S13).

The situation considered as the cause for the disc-search-disabled state will now be described.

Figure 38:
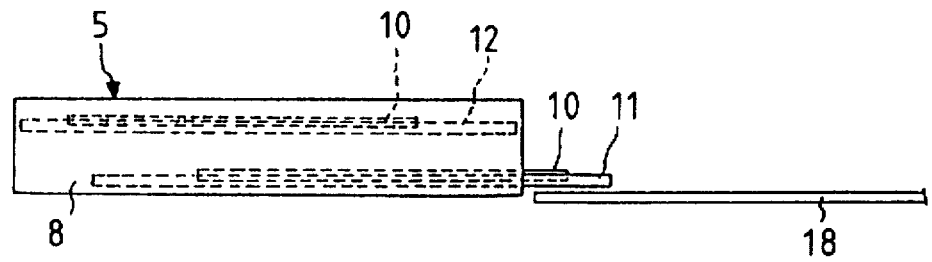

As shown in FIG. 38, when the pray 11, carrying the disc 10 the playing of which has been finished, is pressed by the disc engagement member 53 (shown in FIG. 9, etc.) to be stored in the magazine body 8 of the magazine 5, it is considered that the friction force between the magazine body 8 and the tray is increased by the influence of greasy dirt (from human hands) deposited on the tray 11 and moisture to make it impossible to completely press the tray into the magazine body 8. In this case, a detection signal may be generated from the detection switch 89 for detecting the storage of the tray in the magazine body 8 though the tray 11 is not completely stored into the magazine body 8. That is to say, the tray engagement member 53 and other members such as driving force transmission members for transmitting the driving force from the motor 62 to the tray engagement member may be deformed little by little by driving force, or the entire mechanism constituted by the aforementioned members may be contracted within the range of the cumulative value of common differences between the respective members, so that the moving body 56 for operating the detection switch 89 may move the actuator of the detection switch 89, though the rotation is prevented by the friction force between the magazine body 8 and the tray 11 while the tray engagement member 53 does not yet completely press the tray 11 into the magazine body 8.

As shown in FIG. 38, in this case, though the moving-up of the moving member 18 is required to bring the playing means to a designated position corresponding to the next disc 10 to be played, the end portion of the moving member 18 and parts mounted on the moving member may be brought into contact with the tray 11 which partly projects out of the magazine body 8, so that the moving-up operation of the moving member 18 is prevented to thereby cause the disc-search-disabled state.

When the disc-search-disabled state appears two times, the contents of storage of the disc-search-disabled state in the first time is erased (Step S14) and the selector moving instruction is cancelled (Step S15). Then, indicator means in the form of a light-emitting diode (LED) expresses that playing is turned off (Step S16), and then the operation stops.

Figure 39:
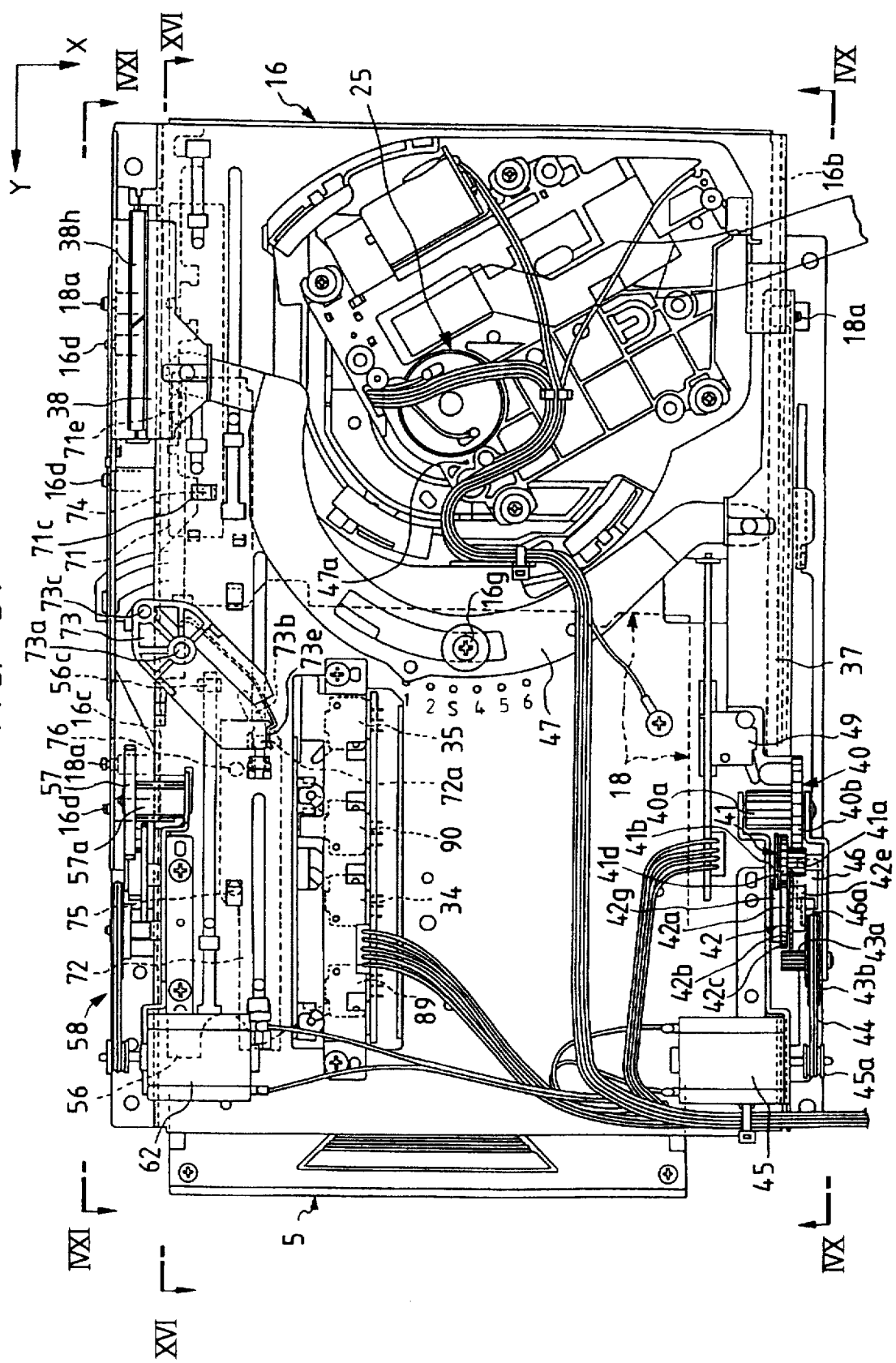
FIG. 39 is a plan view of the inside structure of the multi-disc storage player according to another embodiment of the present invention.

On the other hand, when in Step S13 the disc-search-disabled state appears once, the fact that the disc-search-disabled state arises once is stored (Step S17). Then the current disc number and the target disc number are compared with each other (Step S18). When the target disc number is higher in rank than the current disc number, that is, when the moving member 18 is now to be moved up (in the Z direction), a selector moving instruction is issued for a predetermined time to move down the moving member 18 once (Steps S-19 through S-21). When, on the contrary, the target disc number is lower in rank than the current disc number, that is, when the moving member 18 is now to be moved down, a selector moving instruction is issued for a predetermined time to move up the moving member 18 once (Steps S22, S20 and S21). As described above, the moving member 18 urged to be moved up or down is once driven in the reverse direction so that the moving member 18 gives impact to tray 11 competing with the magazine body 18 through friction force. Accordingly, the tray 11 is released from the competitive state with respect to the magazine body 8. Thereafter, the passage of a predetermined time elapses (Step S23), preferably the disc engagement member 53 {shown in FIGS. 9, 32(a) and 32(b)} is rotated clockwise in FIG. 9 and then the tray 11 partly projecting out of the magazine body as shown in FIG. 39 is completely stored in the magazine body 8. Though the tray 11 is not pressed again by the disc engagement member 53, the tray 11 released from the competitive state with respect to the magazine body 8 through friction force can be completely pulled into the magazine 8 by the urging force of the pressing lever 14 within the magazine body 8 as shown in FIG. 2(b).

As described above, the tray 11 is released from the competitive state with respect to the magazine body 8 by moving the moving member 18 once slightly in the direction reverse to the target direction, whereafter the moving member 18 is once returned to the lowermost position as a home position until a detection signal is generated from the detection switch 49 (Step S24). When a detection signal from the photosensor 51 is obtained (Step S25) to confirm that the moving member 18 is in the home position, a judgement is made as to whether a STOP instruction is present or not (Step S26). Then the moving member 18 is moved to the designated position corresponding to the designated disc. After the moving member is returned to the home position, the operation for positioning the moving member 18 to the designated position and the play starting operation following the positioning operation are made in the aforementioned operating course (Steps S4–S11).

When a detection signal, from the photosensor 51 expressing the fact that the moving member 18 is in the home position cannot be obtained though a predetermined time has passed after the selector moving instruction is issued to return the moving member 18 to the home position (Step S27), this state is regarded as a disc-search-disabled state, so that the aforementioned operation from Step S13 is repeated. Thus, the aforementioned procedure is repeated correspondingly to the designated music number.

Although this embodiment has shown the case where the moving member 18 is moved through the cam grooves 37d and 38d by rotating the double gear 40 engaged with the rack portion 37h formed on the moving plate 37, to thereby perform positioning of the magazine 5 acting as a disc storage portion relative to the playing means in the direction of disc arrangement, the present invention is applicable to the case where a rack portion may be formed on the moving member 18 directly without the moving plates 37 and 38 so that a gear engaged with the rack portion can be rotated.

Although this embodiment has shown the case where friction force produced between the magazine body 8 of the magazine 5 and each tray 11, 12 is increased so that the tray cannot be perfectly stored in the magazine body 8, the invention is applicable to the case where, in another player having a disc storage portion including a plurality of disc storage shelves for directly storing discs without trays 11 and 12, friction force produced between the disc storage portion and the respective disc is increased.

As described above in detail, the multi-disc storage player according to the present invention comprises: a positioning means for relatively positioning a disc storage portion, which is capable of systematically storing a plurality of discs, and a disc playing means in the direction of arrangement of the discs; and a disc moving means for making a selected disc move between the disc storage portion and the playing means. The positioning means includes a movable member for carrying a selected one of the disc storage portion and the playing means, a driving mechanism for making the movable member move according to an instruction of movement, and a controlling means for issuing said instruction of movement to the driving mechanism until a designated position corresponding to a disc designated by an instruction of playing coincides with a current position of the movable member. The controlling means issues an instruction of movement in the direction reverse to a first direction to the driving mechanism upon detecting passage of a predetermined time before the designated position coincides with the current position after issuance of an instruction movement in the first direction to the driving mechanism.

For example, in the case where the friction force between the disc storage portion and a disc to be stored therein or a tray carrying the disc becomes so large that the disc after playing cannot be completely stored in the disc storage portion because the disc or tray partly projects out of the disc storage portion to suppress the movement of the playing means relative to the disc storage portion through the engagement of the disc or tray with the movable member or parts mounted thereon, the state of engagement can be released by moving the movable member in a direction reverse to the target direction. By such a series of locking and unlocking operations, the disc or tray competing with the disc storage portion through the friction force is given an impact, so that the disc or tray is released from the state of competition with the disc storage portion. Thereafter, the disc or tray can be smoothly stored in the disc storage portion by the action of urging means which are provided in the disc storage portion to pull the disc in.

Accordingly, the occurrence of the disc-search-disabled state caused by the imperfect storage of the disc in the disc storage portion can be prevented, so that continuous playing of a plurality of discs is carried out smoothly.

The multi-disc storage player according to the another embodiment of the present invention will now be described with reference to the accompanying drawings.

Figure 42:
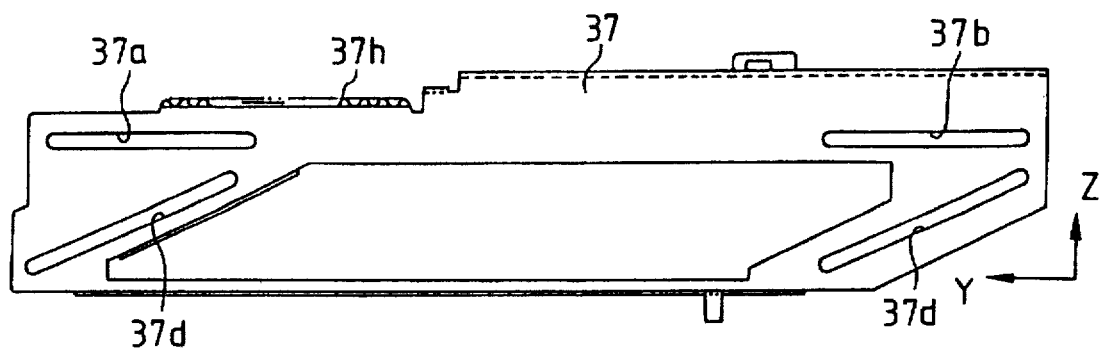
FIGS. 42–45 are partial detailed view of the inside structure depicted in FIGS. 39–41.
Figure 43:
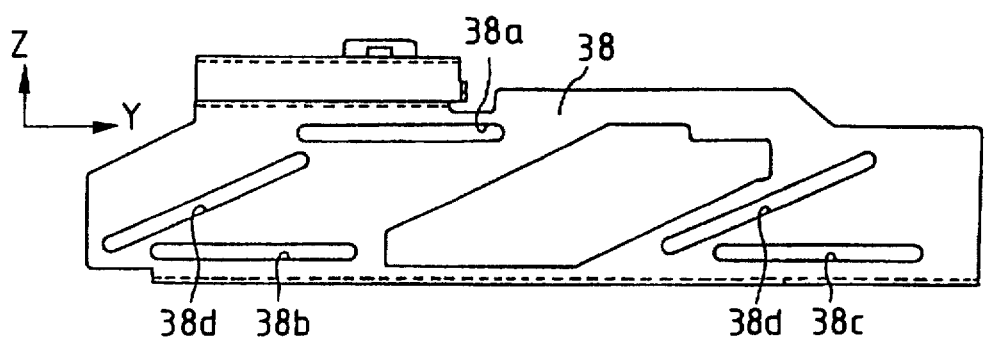

As shown in FIGS. 39, 40 and 42, a rack portion 37h is formed in the front end portion of the right moving plate 37 so as to be arranged along the direction of extension of the moving plate. It is apparent from FIGS. 39 and 40 that the rack portion 37h is engaged with a small gear portion 40a of a double gear 40 formed by uniting two different gears provided on the chassis 16. As shown also in FIGS. 44(a) and 44(b), a large gear portion 40b of the double gear 40 is engaged with a small gear portion 41a of another double gear 41 arranged in the front thereof. A partially toothed gear 42 having a tooth-lacking portion 42a is provided in the front of the double gear 41. A large gear portion 41b of the double gear acting as a driven gear is engaged with a gear portion 42b of the partially toothed gear 42. A gear 42c which is united with the partially toothed gear 42 is engaged with a gear 43a arranged in the front of the gear 42c. A large pulley 43b which is united with the gear 43a is overlaid with a transmission belt 44. The transmission belt 44 is laid over a small pulley 45a disposed on an output shaft of a motor 45.

The aforementioned, double gears 40 and 41, partially toothed gear 42 and gears 42 and 43c generally constitute a gear transmission mechanism. The small gear portion 40a of the double gear 40 engaged with the rack portion 37h is the last-stage gear in the gear transmission mechanism. The motor 45 serves as a driving source for imparting a driving force to the gear transmission mechanism. The motor 45, the rack portion 37h formed on the moving plate 37 and the gear transmission mechanism make up a driving mechanism. A movable member (described above) constituted by a moving member 18 and moving plates 37 and 38 is driven by the driving mechanism. The rack portion 37h, together with the double gear 40 engaged with the rack portion, serves as a moving mechanism for moving the movable member corresponding to the rotation of the double gear 41 acting as a driven gear. Although this embodiment has shown the case where the moving mechanism is constituted by the rack portion 37h and the gear 40, the invention is applicable to the case where the moving mechanism is constituted by a worm and a worm wheel.

As described above, the gear transmission mechanism includes the partially toothed gear 42 having the tooth-lacking portion 42a. A cam portion 42e is provided on a side of the is gear 42c united with the partially toothed gear 42. A detection switch 46 acting as a rotation detecting means is arranged under the gear 42c. The cam portion 42e is capable of being engaged with an actuator 46a of the detection switch. The cam portion 42e is engaged with the actuator 46a of the detection switch 46 whenever the tooth-lacking portion 42a of the partially toothed gear reaches a position where the partially toothed gear 42 can be engaged with the large gear portion 41b of the double gear 41 acting as driven gear following the partially toothed gear 42. Accordingly, the detection switch 46 generates a detection signal whenever the cam portion 42e reaches the actuator 46a.

Figure 45:
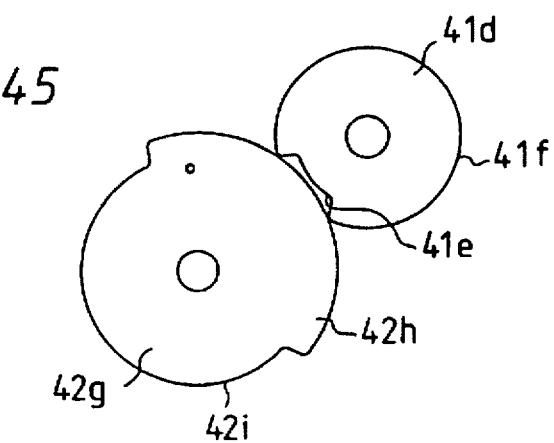
Figure 44A:
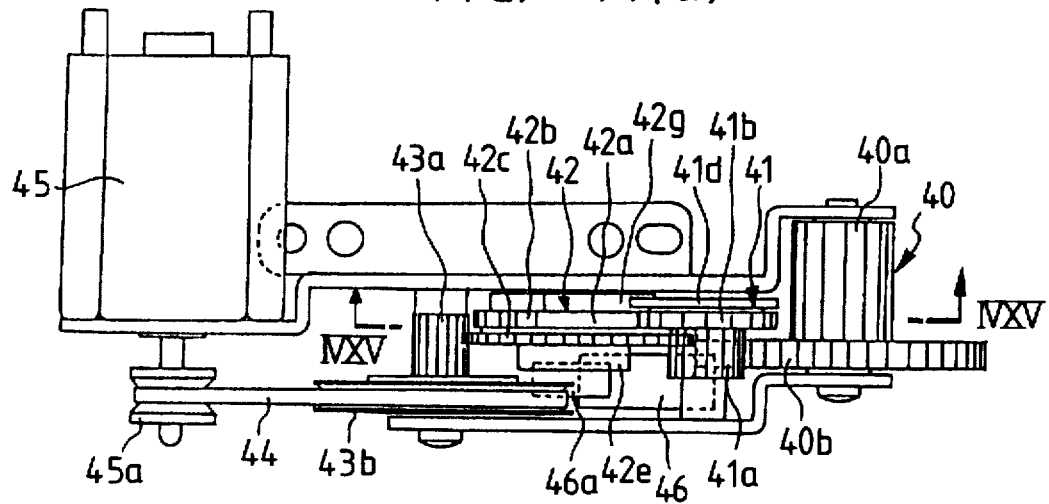
Figure 44B:
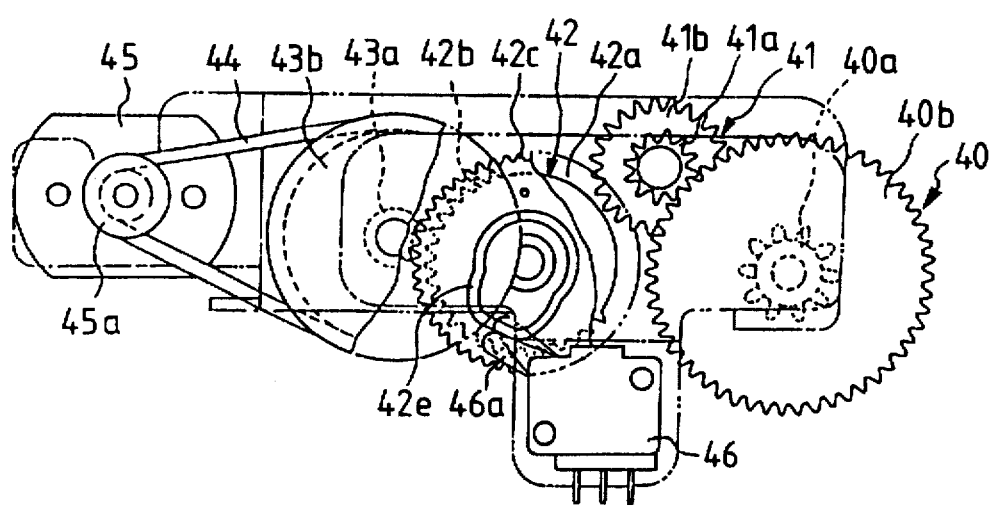

It is particularly apparent from FIG. 44(a) that the partially toothed gear 42 and the double gear 41 acting as a driven gear engaged with the partially toothed gear 42 have cam portions 42g and 41d respectively united with the gears 42 and 41 and engaged with each other. The cam portions 42g and 41d are not shown in FIG. 44(b). FIG. 45 is a sectional view taken along the line IVXV—IVXV in FIG. 44(a), showing the details of the cam portions. As shown in FIG. 45, the cam portion 41d provided in the double gear 41 is shaped like a disc and has a notch portion 41e having a predetermined length in the circumferential direction at the outside thereof. The cam portion 42g provided in the partially toothed gear 42 is also shaped like a disc and has a jog portion 42h having a predetermined length in the circumferential direction at the outside thereof. The two cam portions 42g and 41d are arranged so that the outer circumferences 42i and 41f are near each other slidably in contact with each other.

As shown in the drawing, the jog portion 42h formed in the cam portion 42g is capable of being fitted into the notch portion 42h into the notch portion 41e, the forward and reverse rotation of the double gear 41 including the cam portion 41d is prevented. The jog portion 42h is formed corresponding to the tooth-lacking portion 42a of the partially toothed gear 42 and has the same length as that of the tooth-lacking portion. Accordingly, the rotation of the double gear 41 is limited when the tooth-lacking portion 42a of the partially toothed gear 42 is engaged with the double gear 41 acting as a driven gear.

In the aforementioned configuration, by suitably establishing the tooth-lacking range of the partially toothed gear 42, the partially toothed gear 42 can be stopped so that the gear portion 42b of the partially toothed gear 42 is not engaged with the double gear 41 acting as a driven gear or, in other words, the teeth of the double gear 41 are located in the tooth-lacking range. Accordingly, though the partially toothed gear 42 is slightly rotated by the inertial rotation of the motor 45 acting as a driving source after the operation of stopping the motor 45 is carried out corresponding to the stop signal, the gear portion 42b of the partially toothed gear 42 is not still engaged with the double gear 41. Therefore, the inertial motive power of the motor is not transmitted to members posterior to the double gear 41.

Further, at this time, the rotation of the double gear 41 is limited by the action of the cam portions 42g and 41d, thereby limiting the inertial operation of the respective members of from the double gear to the moving member 18. Accordingly, the playing means including the turntable 23 is positioned with high accuracy relative to the magazine 5 in the direction of disc arrangement.

As shown in FIG. 39, a turnlever 47 is arranged between the right and left moving plates 37 and 38 and mounted on the chassis 16 so as to be rotatable around the virtual center 47a through a pin 16g provided on the chassis 16. The opposite end portions of the turnlever 47 are pivoted to the right and left moving plates 37 and 38.

As shown in FIG. 39, a detection switch 49 is provided at the upper portion of the right side elevational portion 16b included in the chassis 16. The detection switch 49 serves to detect the fact that the moving plate 37 reciprocating in the front-and-rear directions is in the furthest-returned position (forward movement limit position). The detection switch 49 is operated by the engagement of part of the moving plate 37 with the actuator thereof.

The detection signal generated from the detection switch 46 is fed to a counter (now shown) for counting the detection signal. A controller (not shown) performing automatic control of the multi-disc storage player and including the counter is arranged in a predetermined position within the player housing 2. The controller recognizes the stop position of the moving plate 37 based on the count value of the counter.

When a moving instruction is given in the presence of a detection signal from the selection switch 46, the controller serves to move the moving plate 37 by a distance corresponding to the difference between the current address and the requested address. When a moving instruction is given in the absence of a detection signal from the detection switch 46, the controller serves to move (backward) the moving plate 37 until the detection signal from the detection switch 46 is obtained and then to move the moving plate 37 to the requested address.

As shown in FIGS. 39 and 11, two detection switches 89 and 90 other than the detection switches 34 and 35 are arranged in parallel to the detection switches 34 and 35 in the chassis 16. The two detection switches 89 and 90 are capable of being engaged with the moving body 56 driven by the motor 62 to thereby detect the moving position of the moving body.

Figure 46:
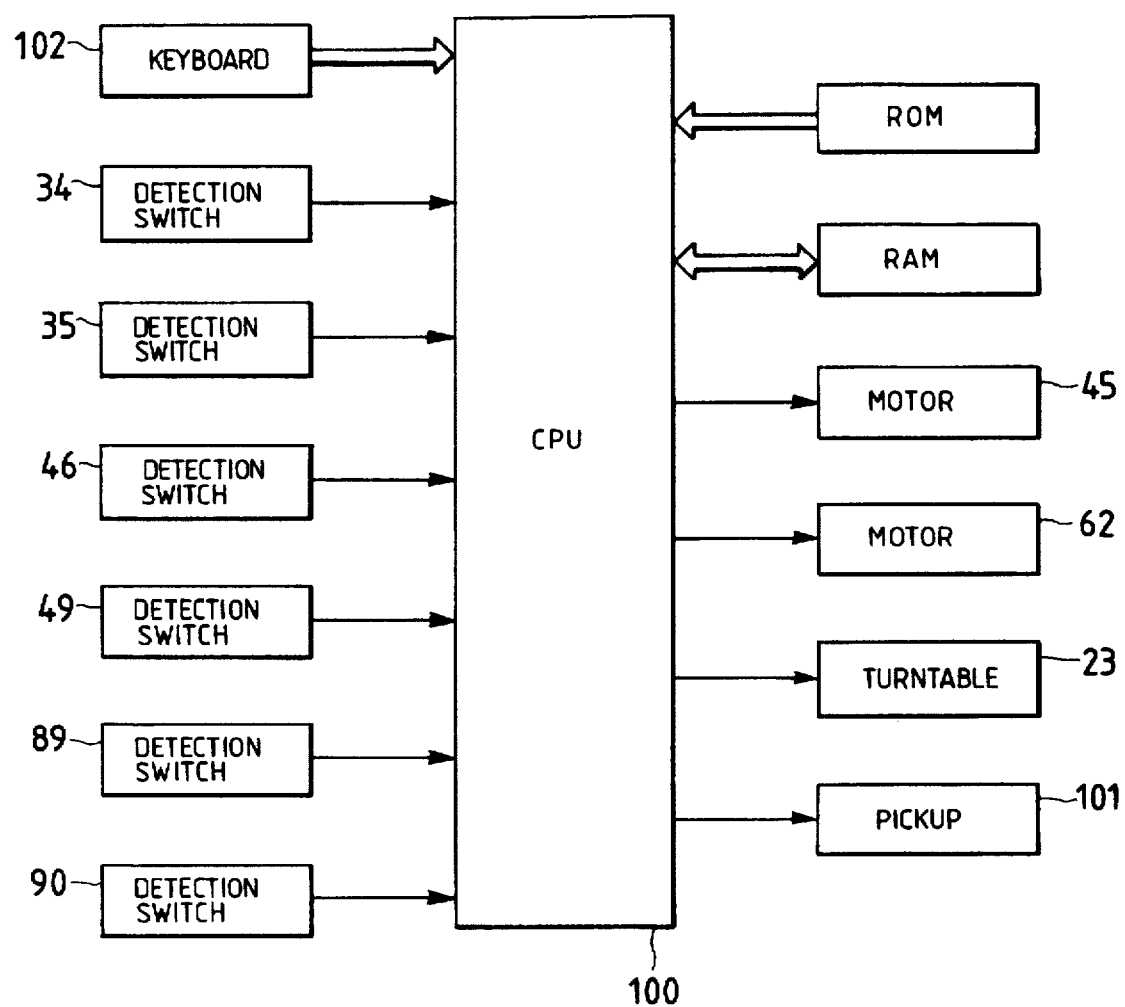
FIG. 46 is a block diagram of a control system in the multi-disc storage player according to a further embodiment of the present invention.

As shown in FIG. 46, detection signals generated from the detection switches 34, 35, 46, 49, 89 and 90 are transmitted to the controller (CPU) 100, so that the motors 45 and 62, the turntable 23 and the pickup 101 operate in predetermined timing which will be described later, based on the operation signals given from the controller corresponding to the detection signals.

The operation of the aforementioned multi-disc storage player will now be described briefly based on the playing procedure with reference to FIGS. 47, 48(a)–48(f), and 49(a)–49(c).

Figure 47:
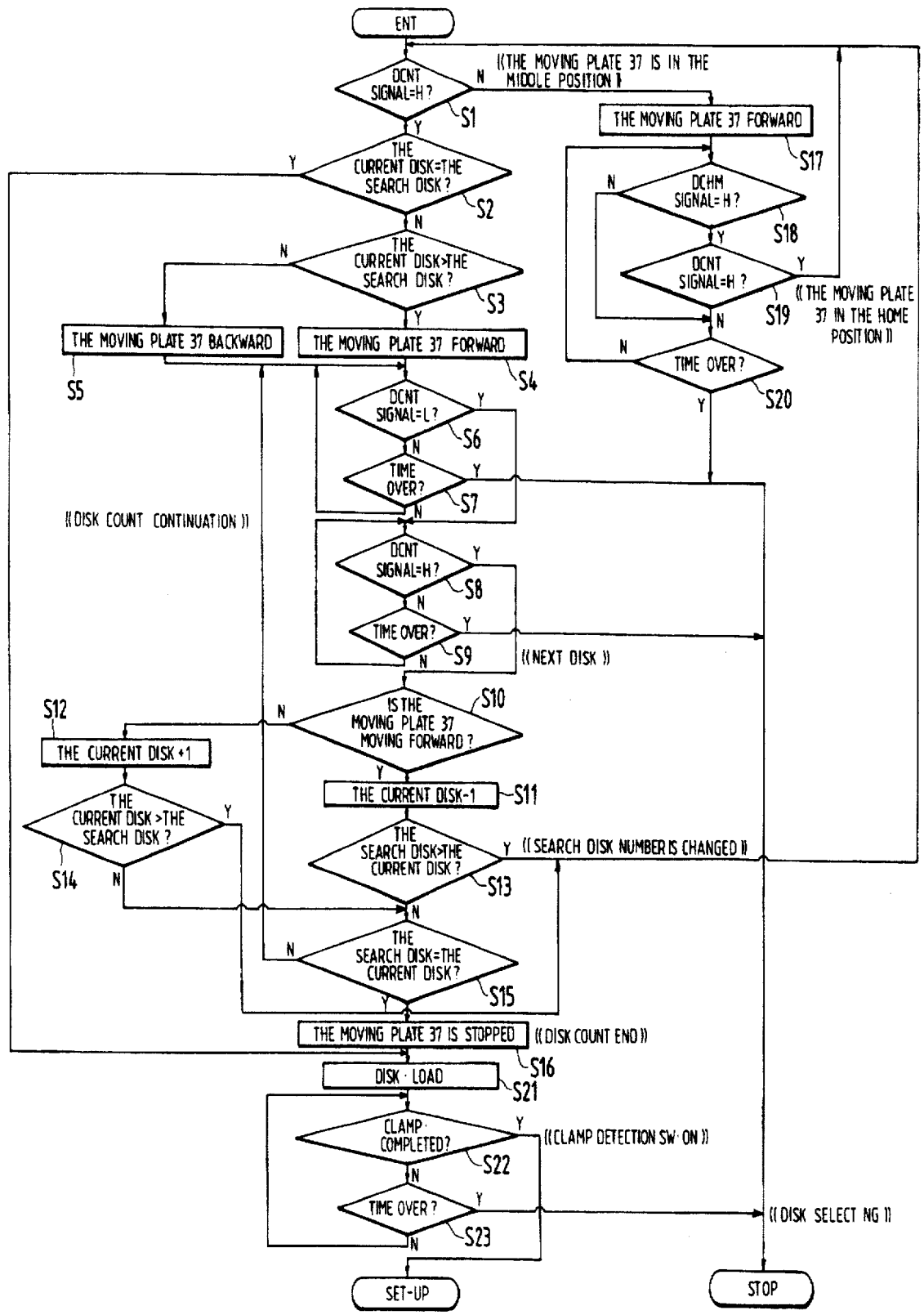
FIG. 47 is a flow chart for explaining the operation of the multi-disc storage player of the further embodiment.
Figure 48A:
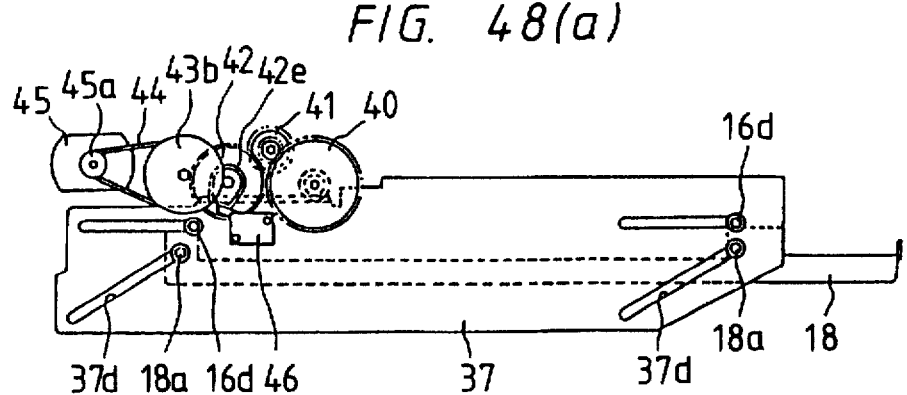
FIGS. 48(a)–48(f), 49(a)–49(d) and 50(a)–50(d) are views for explaining the operation of the inner mechanism of the multi-disc storage layer of the further embodiment.
Figure 48B:
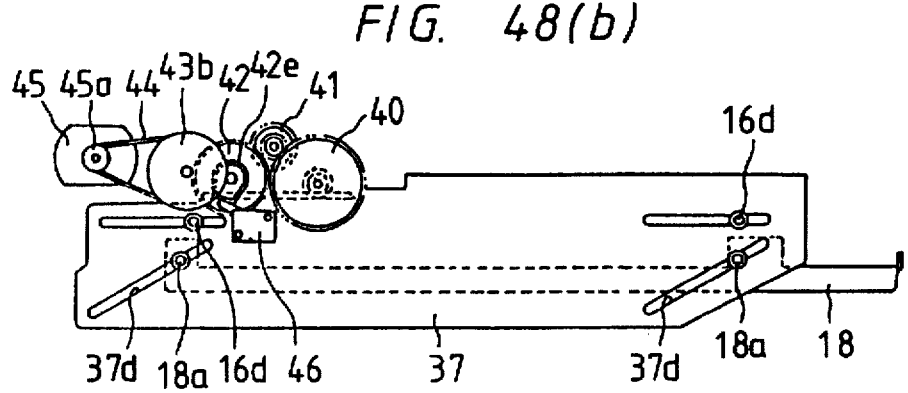
Figure 48C:
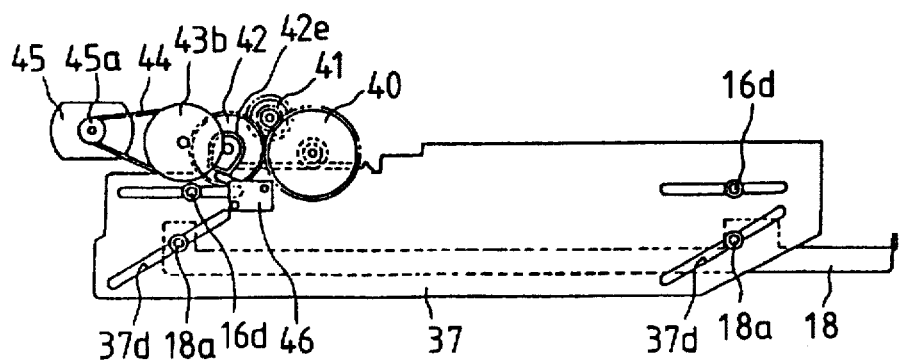
Figure 48D:
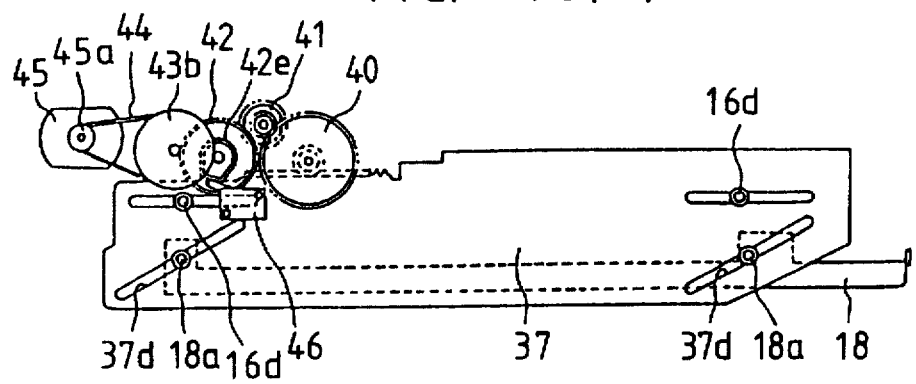
Figure 48E:
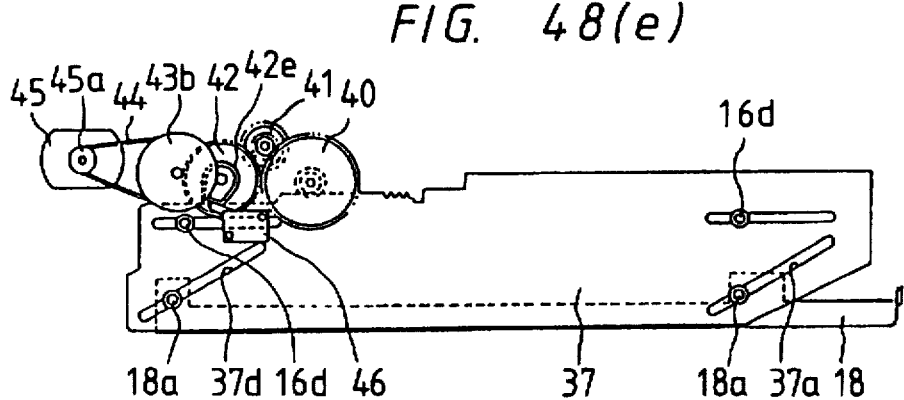
Figure 48F:
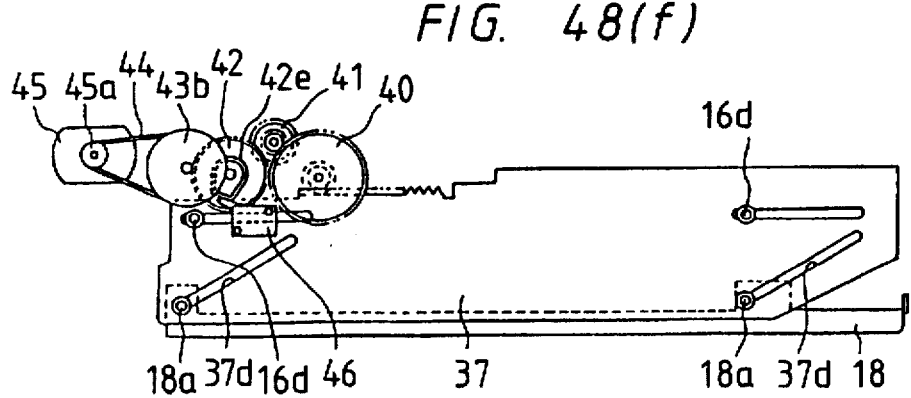
Figure 49A:
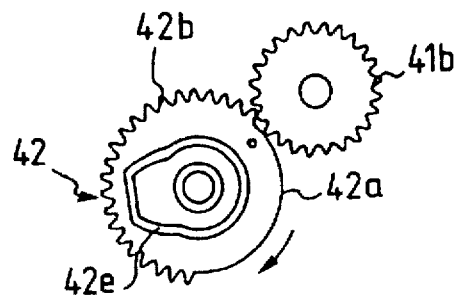
Figure 50A:
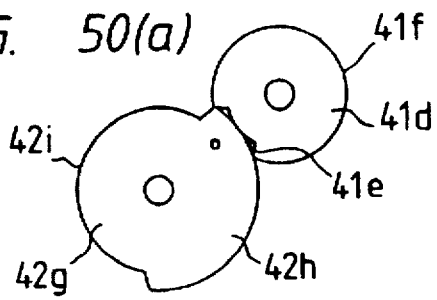
Figure 49B:
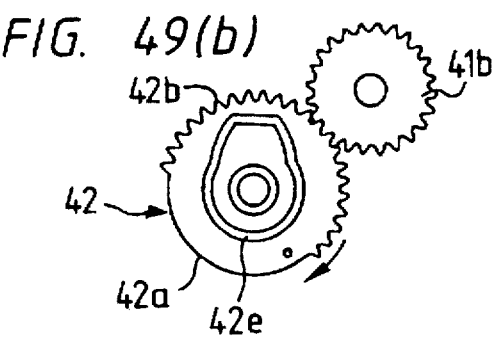
Figure 50B:
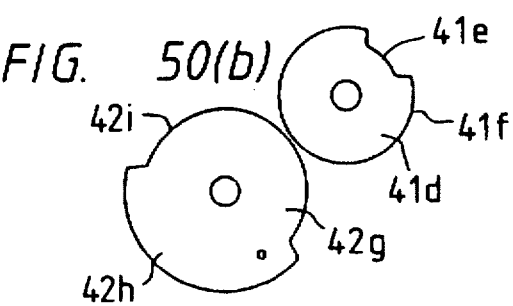
Figure 49C:
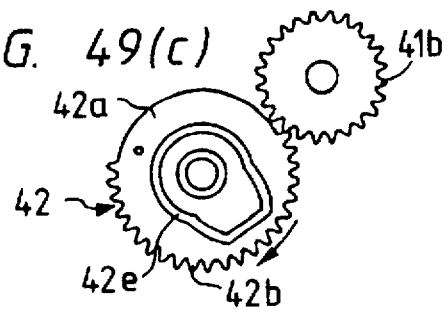
Figure 50C:
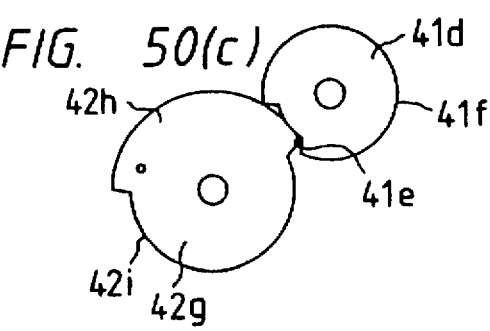
Figure 49D:
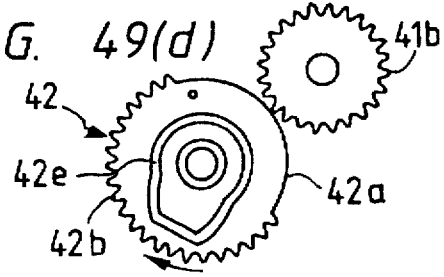
Figure 50D:
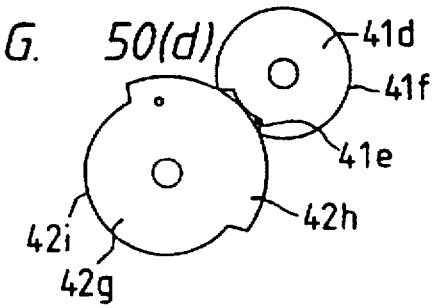
Figure 51:
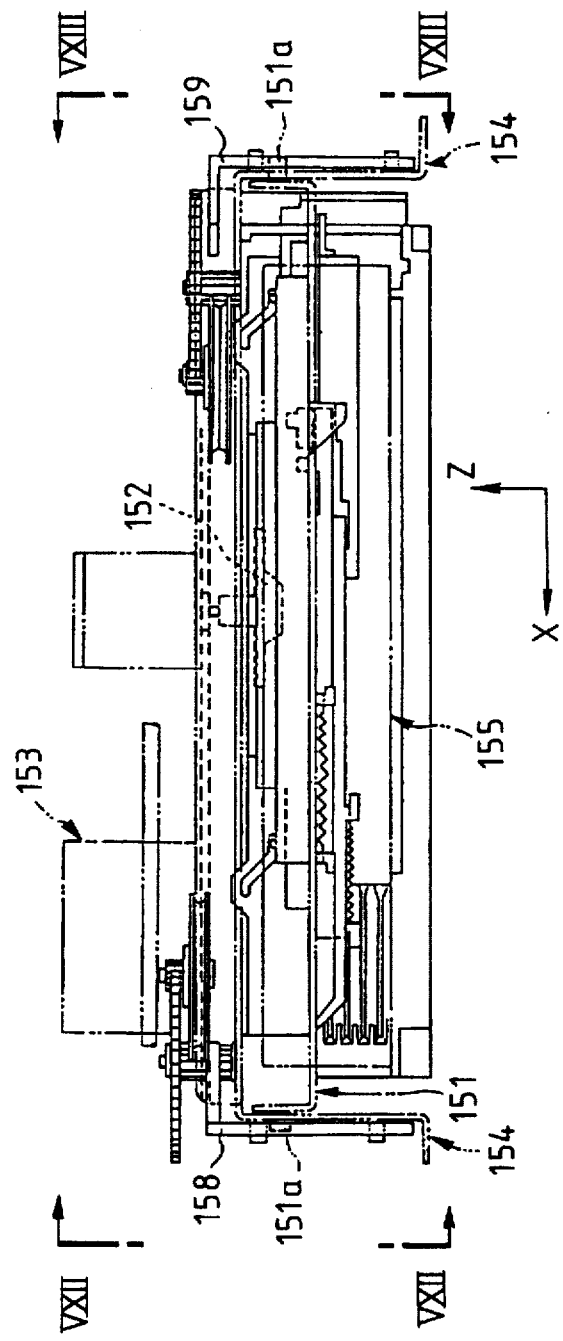
FIGS. 51–57 are views for explaining a conventional multi-disc storage player
Figure 52:
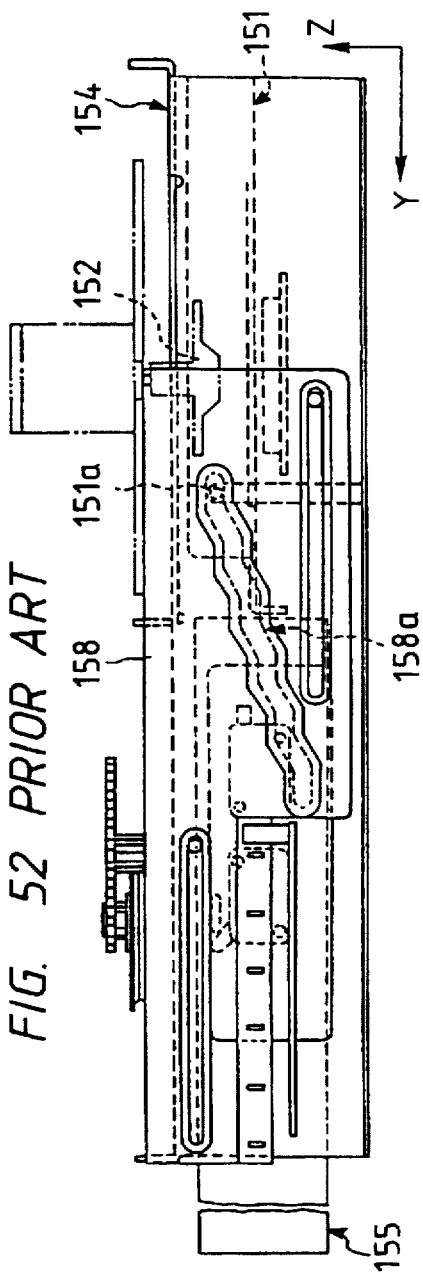
Figure 53:
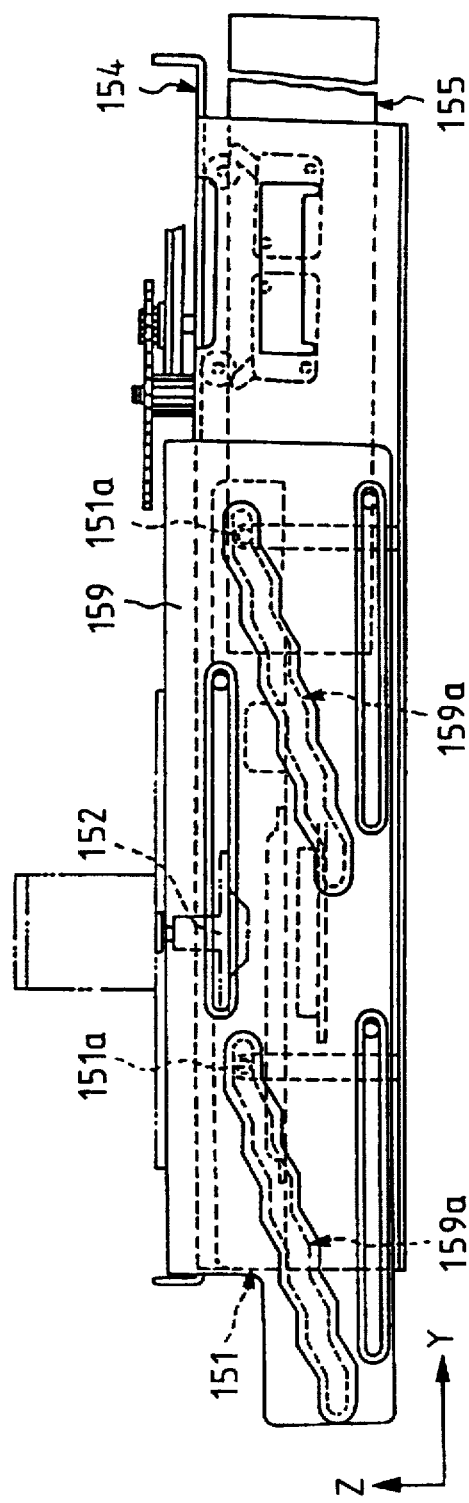
Figure 54:
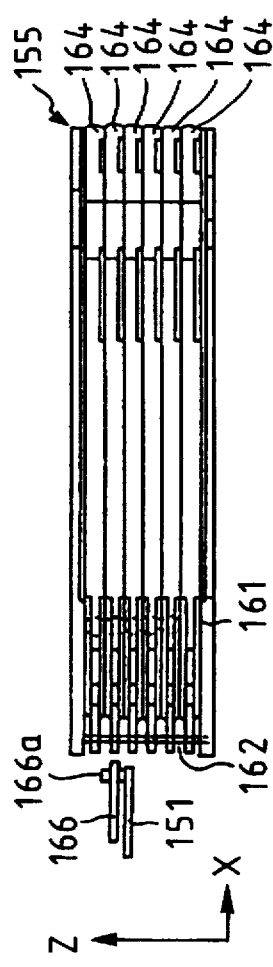
Figure 55:
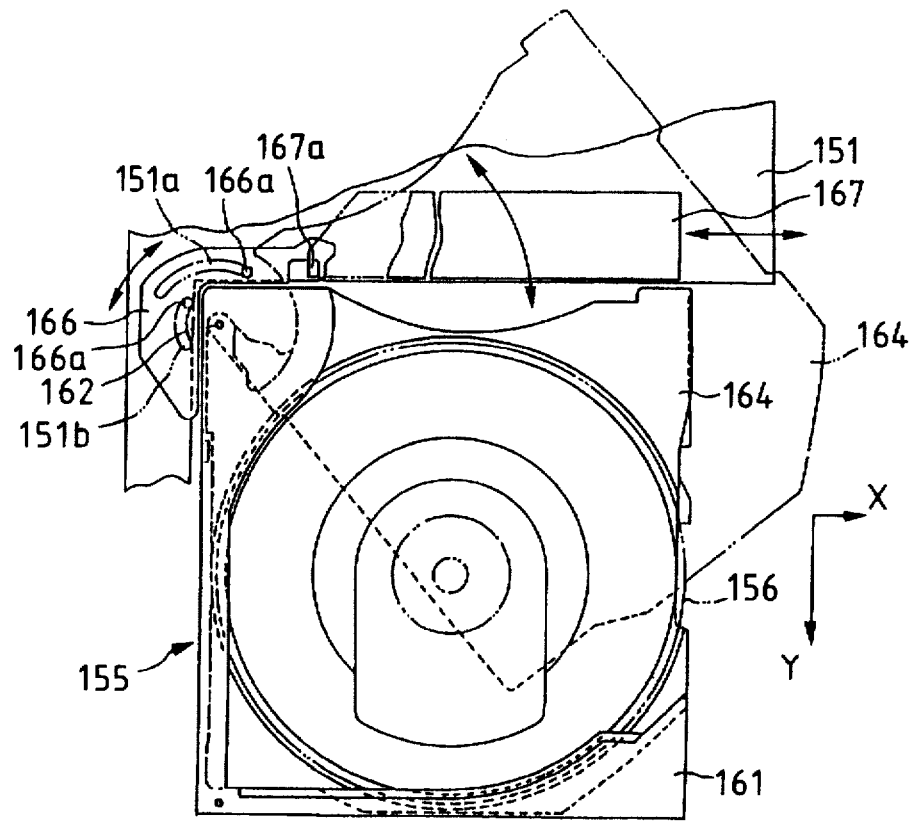
Figure 56:
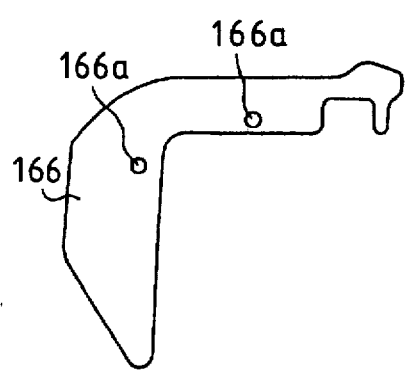
Figure 57:
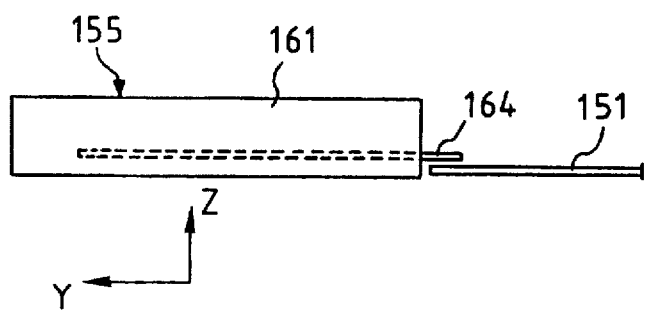

When a playing instruction to play a desired disc is issued by operating the keyboard 102 (shown in FIG. 46) of the operation button group as shown in FIG. 1, the disc player operates according to the flowchart shown in FIG. 47. In FIG. 47, DCNT signal represents detection signal generated from the detection switch 46, and DCHM signal represents a detection signal generated from the detection switch 49 for detecting the fact that the moving plate 37 is in the furthest-returned position (forward movement limit position).

As shown in FIG. 47, when playing instruction is issued, the controller judges whether the DCNT signal is present or not (Step S1). When the DCNT signal is present, the controller causes the moving plate 37 to move by a distance corresponding to the difference between the current address (current DISC) and the requested address (search DISC). When the DCNT signal from the detection switch 46 is absent, the controller causes the moving plate 37 to return to the furthest-returned position once until the detection signal from the detection switch 46 is obtained, and then causes the moving plate 37 to move to the position of the requested address (search DISC). In the following, the operation is described in more detail.

First, the operation in the presence of the DCNT signal is described. While the DCNT signal is generated, the controller judges whether the current address coincides with the requested address or not (Step S2). When these addresses coincide with each other, a disc loading operation, which will be described, starts. On the contrary, when these addresses do not coincide with each other, the controller compares the current address with the requested address (Step S3) and causes the motor 45 to rotate forward or in reverse on the basis of the result of the comparison, thereby moving the moving plate 37 forward (Step S4) or backward (Step S5). If the DCNT signal is counted by one during the moving of the moving plate 37 (Steps S6-S9), the controller judges whether the moving plate is moving forward or backward (Step S10). When the moving plate is moving forward, the controller updates the current address to current DISC−1 (Step S11). When the moving plate is moving backward, the controller updates the current address to current DISC+1 (Step S12). Then, the controller compares the new current address with the requested address (Steps S13 and S14). The aforementioned operation is repeated until the current address coincides with the requested address (Step S15). The controller makes the moving plate 37 stop at the point of time when the two address coincide with each other. By the aforementioned operation of positioning the moving plates 37 and 38, through the action of the cam grooves 37d and 38d formed in the moving plates 37 and 38 and the guide groove 16e formed in the chassis 16, the pin 18a movably fitted into the respective grooves is moved up/down, so that the moving member 18 having the pin 18a moves up/down. Accordingly, the playing means including the turntable 23 provided on the moving member 18 and the tray projection member 53 reach positions corresponding to the tray 11 or 12 carrying the disc to be played. Thereafter, the disc loading operation, which will be described later, is carried out. FIGS. 48(a)–48(f) show six stages in which the moving member 18 is driven by moving the moving plate 37 to perform positioning of the playing means and the tray projecting member 53 corresponding to six trays 11 and 12 of the magazine 5. As shown in FIGS. 48(a)–48(f), the cam portion 42e capable of being engaged with the actuator of the detection switch 46 turns in the same direction in the respective stages, so that the detection switch 46 generates a detection signal to perform positioning of the moving member 18.

The operation in the absence of the DCNT signal will now be described. When a playing instruction signal is issued, the controller makes the moving plate 37 move forward (Step S17), makes it return once to the furthest-returned position, that is, the home position, until the DCHM signal is generated from the detection switch 49 (Step S18) and makes it move the position of the requested address after the DCNT signal is obtained (Step S19). The operation of positioning the moving plate 37 to the requested address after the DCHM signal is obtained is carried out in the aforementioned operating course (Steps S1-S16). When the DCNT signal cannot be obtained, though the moving plate 37 is returned to the home position, the passage of a predetermined time is judged (Step S20) and then the operation stops while the attention is called by an alarm or the like.

When the playing means and the tray engagement member 53 are thus positioned corresponding to the tray carrying the disc to be played, the rotation of the motor 62 starts to drive the moving body 56 backward (in the direction reverse to the Y direction).

At this time, the moving body 56 is in a state in which it is locked with the second lever member 72 by the locking and unlocking means including the movable pieces 75 and 76 (shown in FIG. 16). The first lever member 71 is not yet locked with the moving body 56. Accordingly, the second lever member 72 alone moves backward together with the moving body 56, so that the tray engagement member 53 rotates counterclockwise in FIG. 9. Accordingly, as shown in FIG. 2(b), the tray (for example, tray 12) carrying the disc to be played is projected out of the magazine body 8, so that the disc moves to a concentric position with respect to the disc-carrying surface 23a (refer to FIG. 10) of the turntable 23, that is to say, the disc moves to a position just under the disc-carrying surface.

Thereafter, the moving body 56 moves further backward (in the reverse direction to the Y direction), but the second lever member 72 is unlocked from the moving body and at the same time the lever member 71 is locked with the moving body. Accordingly, the first lever member 71 moves backward together with the moving body 56, so that the supports 78 and 79 (shown in FIG. 21, etc.) of the clamping mechanism move upward (in the Z direction). Accordingly, the disc is lifted up and clamped with respect to the turntable 23 (Step S22). The upward movement of the disc is represented by "SC load" (Step S21) in FIG. 38. When a clamping completion signal is not generated, though a predetermined time has passed after the disc loading operation is finished (Step S23), the operation stops while attention is called by an alarm or the like.

Thus, playing is enabled, so that the turntable 23 and the carriage 24 (refer to FIG. 9) operate to start playing.

When playing is finished, the disc is stored in the magazine body 8. Because the disc storing operation is carried out in the reverse course to the disc loading operation, the disc storing operation is not described in detail. Thereafter, the aforementioned procedure is repeated corresponding to the designated music number.

FIGS. 49(a)–49(d) show the condition in which the partially toothed gear 42 having the cam portion 42c for causing the detection switch 46 to generate the detection signal is engaged with the gear 41b following the partially toothed gear 42.

FIGS. 50(a)–50(d) show the condition of engagement between the cam portions 42g and 41d respectively corresponding to the condition of engagement between the tooth-lacking portion 42a and the gear 41b shown in FIGS. 49(a)–49(d).

Although this embodiment has shown the case where the moving member 18 is moved through the cam grooves 37d and 38d by rotating the double gear 40 engaged with the rack portion 37h formed on the moving plate 37, to thereby perform positioning of the magazine 5 as a disc storage portion relative to the playing means in the direction of disc arrangement, the present invention is applicable to the case where a rack portion is formed on the moving member 18 directly without the moving plates 37 and 38 so that a gear engaged with the rack portion can be rotated.

As described above, in the multi-disc storage player according to another aspect of the present invention, the driving mechanism for moving the movable member carrying a selected one of the disc storage portion and the playing means includes: a partially toothed gear rotated by the rotation of a driving source; a driven gear engaged with the tooth-lacking gear; and a moving mechanism for making the movable member move corresponding to the rotation of the driven gear. The driving mechanism is controlled by a controlling means so as to move the movable member to a designated position corresponding to a disc designated by an instruction of playing. The controlling means includes a detection means for issuing a detection signal whenever a tooth-lacking portion of the partially toothed gear reaches a position of engagement with the driven gear, so that the controlling means starts the rotation of the driving source according to the instruction of playing, and stops the rotation of the driving source when the number of times the detection signal is generated reaches the number corresponding to the designated position.

In the aforementioned configuration, by suitably establishing the tooth-lacking range of the partially toothed gear, the partially toothed gear can be stopped without engagement of the toothed portion of the partially toothed gear with the driven gear, that is to say, the partially toothed gear can be stopped so that the teeth of the driven gear are positioned in the tooth-lacking range of the partially toothed gear. Accordingly, though the partially toothed gear is rotated slightly by the inertial rotation of the driving source after the stopping operation is made corresponding to the stop signal, the toothed portion of the partially toothed gear is not still engaged with the driven gear if the tooth-lacking range is sufficiently large. Accordingly, the inertial motive power of the driving source is not transmitted to members posterior to the driven gear. Consequently, the positioning of the disc storage portion and the playing means relatively in the direction of arrangement of discs is carried out with very high accuracy.

What is claimed is:

1. A multi-disc storage player comprising:
   means for issuing an instruction of playing;
   a positioning means for performing relative positioning of a disc storage portion, which is capable of systematically storing a plurality of discs, and a disc playing means in the direction of arrangement of said discs; and
   a disc moving means for making a selected disc move between said disc storage portion and said disc playing means;
   said positioning means including a movable member for carrying a selected one of said disc storage portion and said disc playing means, a driving mechanism for making said movable member move according to an instruction of movement, and a controlling means for issuing said instruction of movement to said driving mechanism until a designated position corresponding to a disc designated by said instruction of playing coincides with a current position of said movable member;
   said controlling means issuing an instruction of movement to said driving mechanism in a direction reverse to a first direction upon detecting passage of a predetermined period of time before said designated position coincides with said current position, after issuance of said instruction of movement in said first direction to said driving mechanism, to attendantly sense when a disc is imperfectly stored in said disc storage portion and is thereby suppressing movement of said disc playing means relative to said disc storage portion in the direction of arrangement of said discs through engagement of the disc, which is imperfectly stored, with said movable member, resulting in a disc-search-disabled state, wherein said controlling means further judges the number of disc-search-disabled states which has occurred, and then stops a disc selecting operation when the number of disc-search-disabled states becomes greater than a predetermined number, wherein said controlling means erases storage of the disc-search-disabled state which has occurred a first time when the number of disc-search-disabled states becomes greater than the predetermined number; and in which said disc storage portion has an urging means for urging said disc toward a storage position.

2. A multi-disc storage player according to claim 1, wherein when said controlling means has judged that the number of disc-search-disabled states is greater than the predetermined number, said controlling means activates an indicator to indicate that playing is turned off.

3. A multi-disc storage player according to claim 1, in which said urging means comprises a spring biased lever engageable with a respective tray carrying said disc to urge said tray and corresponding said disc toward a retracted storage position.

4. A multi-disc storage player according to claim 1, in which said disc storage portion comprises a magazine provided with a plurality of vertically stacked partitions and housing a plurality of plate-shaped trays, each said tray adapted to carry a disc thereon.

5. A multi-disc storage player according to claim 4, in which each said tray is pivotably mounted on a support shaft disposed in a corner portion of said magazine, such that each said tray is adapted to be projected and retracted with respect to said magazine.

6. A multi-disc storage player according to claim 5, in which each said partition and each said tray have respective openings formed therein proximate to said support shaft and vertically aligned with one another, and further comprising a plurality of spherical pieces disposed in said openings and vertically movable therein.

7. A multi-disc storage player according to claim 6, in which said plurality of spherical pieces are urged together by leaf springs provided at upper and lower end portions of said magazine.

8. A multi-disc storage player according to claim 1, wherein said controlling means causes said driving mechanism to attempt to produce motion in the first direction again after the disc-search-disabled state has occurred and detects when said disc-search-disabled state has occurred at least twice, and further comprising:
   indicator means for indicating that playing is turned off, said controlling means activating said indicator means when said disc-search-disabled state has occurred at least twice.

9. A multi-disc storage player according to claim 8, in which said indicator means comprises a light-emitting diode.

10. A multi-disc storage player comprising:
    means for issuing an instruction of playing;
    a positioning means for performing relative positioning of a disc storage portion, which is capable of systematically storing a plurality of discs, and a disc carrying and conveying means in the direction of arrangement of the discs; and a disc moving means for making a selected disc move between said disc storage portion and said disc carrying and conveying means;

said positioning means including a movable member for carrying a selected one of said disc storage portion and said disc carrying and conveying means; a driving mechanism for making said movable member move according to an instruction of movement, and a controlling means for issuing said instruction of movement to said driving mechanism until a designated position corresponding to a disc designated by said instruction of playing coincides with a current position of said movable member;

said controlling means issuing an instruction of movement to said driving mechanism in a direction reverse to a first direction upon detecting passage of a predetermined period of time before said designated position coincides with said current position, after issuance of said instruction of movement in said first direction to said driving mechanism, to attendantly sense when a disc is imperfectly stored in said disc storage portion and is thereby suppressing movement of said disc carrying and conveying means relative to said disc storage portion in the direction of arrangement of said discs through engagement of the disc, which is imperfectly stored, with said movable member, resulting in a disc-search-disabled state, wherein said controlling means further judges the number of disc-search-disabled states which has occurred, and then stops a disc selecting operation when the number of disc-search disabled states becomes greater than a predetermined number, and wherein said controlling means erases storage of the disc-search-disabled state which has occurred a first time when the number of disc-search disabled states becomes greater than the predetermined number.

11. A multi-disc storage player according to claim 10, wherein said controlling means causes said driving mechanism to attempt to produce motion in the first direction again after the disc-search-disabled state has occurred and detects when said disc-search-disabled state has occurred at least twice, and further comprising:

indicator means for indicating that playing is turned off, said controlling means activating said indicator means when said disc-search-disabled state has occurred at least twice.

12. A multi-disc storage player according to claim 11, in which said indicator means comprises a light-emitting diode.

13. A multi-disc storage player according to claim 11, in which said disc carrying and conveying means comprises a moving member.

14. A multi-disc storage player according to claim 10, wherein when said controlling means has judged that the number of disc-search-disabled states is greater than the predetermined number, said controlling means activates an indicator to indicate that playing is turned off.

* * * * *